United States Patent
Wu

(10) Patent No.: US 9,974,072 B2
(45) Date of Patent: *May 15, 2018

(54) WIRELESS BASE STATION DEVICE USING COORDINATED HARQ COMMUNICATION SYSTEM, WIRELESS TERMINAL DEVICE, WIRELESS COMMUNICATION SYSTEM, AND WIRELESS COMMUNICATION METHOD

(71) Applicant: FUJITSU LIMITED, Kawasaki-shi, Kanagawa (JP)

(72) Inventor: Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/083,063

(22) Filed: Nov. 18, 2013

(65) Prior Publication Data

US 2014/0071926 A1 Mar. 13, 2014

Related U.S. Application Data

(63) Continuation of application No. 13/093,394, filed on Apr. 25, 2011, which is a continuation of application No. PCT/JP2008/003080, filed on Oct. 28, 2008.

(51) Int. Cl.
*H04W 72/04* (2009.01)
*H04L 1/18* (2006.01)
(Continued)

(52) U.S. Cl.
CPC ......... *H04W 72/044* (2013.01); *H04L 1/1812* (2013.01); *H04L 5/0044* (2013.01);
(Continued)

(58) Field of Classification Search
None
See application file for complete search history.

(56) References Cited

U.S. PATENT DOCUMENTS 5,513,379 A 4/1996 Benveniste et al.
5,987,011 A 11/1999 Toh
(Continued)

FOREIGN PATENT DOCUMENTS

CN 101006656 7/2007
CN 101019360 8/2007
(Continued)

OTHER PUBLICATIONS

International Search Report issued for corresponding International Patent Application No. PCT/JP2008/003080, dated Dec. 9, 2008.
(Continued)

*Primary Examiner* — Mohammad S Adhami
(74) *Attorney, Agent, or Firm* — Myers Wolin, LLC

(57) ABSTRACT

A first base station and a second base station perform a coordinated transmission process to a wireless terminal. The first base station includes a transmission unit that transmits to the wireless terminal a first control channel which indicates new data or retransmission data. The wireless terminal includes: a control channel reception unit; a data reception unit for receiving data from the first base station and data coordinately transmitted from the second base station using a resource which is indicated by the first control channel; a control channel transmission unit that transmits a second control channel related to a retransmission of the data received by the data reception unit to at least the first base station; and a reception control unit that controls Hybrid Automatic Repeat reQuest (HARQ) process for data coordinately transmitted by at least the first base station and the second base station based on the first control channel.

6 Claims, 15 Drawing Sheets

(51) Int. Cl.
*H04L 5/00* (2006.01)
*H04L 1/00* (2006.01)
*H04W 36/02* (2009.01)
*H04W 36/18* (2009.01)

(52) U.S. Cl.
CPC .......... *H04L 5/0053* (2013.01); *H04L 1/0025* (2013.01); *H04L 1/1887* (2013.01); *H04L 2001/0097* (2013.01); *H04W 36/023* (2013.01); *H04W 36/18* (2013.01)

(56) References Cited

U.S. PATENT DOCUMENTS

| | | | |
|---|---|---|---|
| 6,684,068 | B1 | 1/2004 | Tikka et al. |
| 7,006,838 | B2 | 2/2006 | Diener et al. |
| 2002/0169539 | A1 | 11/2002 | Menard et al. |
| 2004/0233999 | A1 | 11/2004 | Manstorfer et al. |
| 2004/0264403 | A1 | 12/2004 | Fette et al. |
| 2005/0286408 | A1 | 12/2005 | Jin et al. |
| 2006/0039299 | A1 | 2/2006 | Ihm et al. |
| 2006/0120477 | A1 | 6/2006 | Shen et al. |
| 2007/0245204 | A1 | 10/2007 | Yomo et al. |
| 2007/0255993 | A1 | 11/2007 | Yap et al. |
| 2008/0063097 | A1 | 3/2008 | Horiuchi et al. |
| 2008/0080423 | A1* | 4/2008 | Kolding et al. ............ 370/329 |
| 2008/0155148 | A1 | 6/2008 | Oyman |
| 2008/0160912 | A1 | 7/2008 | Kim et al. |
| 2008/0182581 | A1 | 7/2008 | Ishikawa |
| 2008/0222478 | A1 | 9/2008 | Tamaki |
| 2008/0225766 | A1 | 9/2008 | Roy |
| 2008/0233964 | A1 | 9/2008 | McCoy et al. |
| 2008/0310396 | A1* | 12/2008 | Park et al. ............ 370/350 |
| 2009/0175214 | A1* | 7/2009 | Sfar et al. ............ 370/315 |
| 2009/0190543 | A1 | 7/2009 | Ihm et al. |
| 2009/0313518 | A1 | 12/2009 | Shen et al. |
| 2010/0027456 | A1* | 2/2010 | Onggosanusi et al. ....... 370/312 |
| 2010/0027471 | A1* | 2/2010 | Palanki ............ H04B 7/024 370/328 |
| 2010/0035555 | A1* | 2/2010 | Bala et al. ............ 455/63.1 |
| 2010/0067604 | A1* | 3/2010 | Bhadra et al. ............ 375/267 |
| 2010/0091678 | A1* | 4/2010 | Chen et al. ............ 370/252 |
| 2010/0091708 | A1* | 4/2010 | Nishikawa ........ H04W 72/0413 370/328 |
| 2010/0098012 | A1* | 4/2010 | Bala et al. ............ 370/329 |
| 2010/0220683 | A1* | 9/2010 | Novak et al. ............ 370/330 |
| 2010/0222063 | A1 | 9/2010 | Ishikura et al. |
| 2010/0296454 | A1 | 11/2010 | Park et al. |
| 2010/0309996 | A1* | 12/2010 | Lim et al. ............ 375/260 |
| 2011/0170489 | A1 | 7/2011 | Han et al. |
| 2011/0305195 | A1* | 12/2011 | Forck et al. ............ 370/328 |

FOREIGN PATENT DOCUMENTS

| | | |
|---|---|---|
| CN | 101032104 A | 9/2007 |
| CN | 101095296 A | 12/2007 |
| CN | 101233703 A | 7/2008 |
| EP | 0 684 744 A2 | 11/1995 |
| EP | 1 788 740 | 5/2007 |
| EP | 1 944 896 A1 | 7/2008 |
| JP | 2008-503974 | 2/2008 |
| JP | 2008-517484 | 5/2008 |
| JP | 2008-182542 | 8/2008 |
| RU | 2 154 901 C2 | 8/2000 |
| RU | 2 262 202 C2 | 10/2005 |
| RU | 2 285 337 C2 | 10/2006 |
| RU | 2 285 342 C2 | 10/2006 |
| RU | 2 313 179 C2 | 12/2007 |
| WO | 01/39386 A1 | 5/2001 |
| WO | 02/47361 A2 | 6/2002 |
| WO | 02/47408 A2 | 6/2002 |
| WO | 2007112143 | 10/2007 |
| WO | 2008/034335 A1 | 3/2008 |
| WO | 2008127037 | 10/2008 |
| WO | 2010017101 | 2/2010 |
| WO | 2010/044808 A1 | 4/2010 |
| WO | 2010/048440 | 4/2010 |

OTHER PUBLICATIONS

Viterbi, Andrew J. et al; "Soft Handoff Extends CDMA Cell Coverage and Increases Reverse Link Capacity"; IEEE Journal on Selected Areas in Communications, vol. 12, No. 8, pp. 1281-1288; Oct. 1994.
Roh, Wonil et al; "MIMO Channel Capacity for the Distributed Antenna Systems"; IEEE VTC '02, vol. 3, pp. 706-709; Sep. 2002.
Ni, Zhi et al; "Impact of Fading Correlation and Power Allocation on Capacity of Distributed MIMO"; IEEE 6th CAS Symp. on Emerging Technologies: Mobile and Wireless Comm., vol. 2, pp. 697-700; Shanghai, China, May 31-Jun. 2, 2004.
Jafar, Syed A. et al; "Degrees of Freedom Region of the MIMO X Channel"; IEEE Transactions on Information Theory, vol. 54, No. 1, pp. 151-170; Jan. 2008.
Wang, Dongming et al; "Spectral Efficiency of Distributed MIMO Cellular Systems in a Composite Fading Channel"; IEEE International Conference on Communications, 2008. ICC '08, pp. 1259-1264. May 19-23, 2008.
Simeone, Osvaldo et al; "Distributed MIMO in Multi-Cell Wireless Systems via Finite-Capacity Links"; ISCCSP 2008, pp. 203-206. Malta, Mar. 12-14, 2008.
3GPP TR 25.814 V7.0.0; 3rd Generation Partnership Project; Technical Specification Group Radio Access Network; "Physical layer aspects for evolved Universal Terrestrial Radio Access (UTRA) (Release 7)"; Jun. 2006.
3GPP TR 36.913 V8.0.0; 3rd Generation Partnership Project; Technical Specification Group Radio Access Network; "Requirements for Further Advancements for E-UTRA (LTE-Advanced) (Release 8)"; Jun. 2008.
Texas Instruments; "Network MIMO Precoding"; Agenda Item 12; R1-082497; 3GPP TSG RAN WG1 #53bis; Warsaw, Poland, Jun. 30-Jul. 4, 2008.
Alcatel Shanghai Bell, Alcatel Lucent; "Collaborative MIMO for LTE-A downlink"; Agenda Item 12; R1-082501; 3GPP TSG RAN WG1 Meeting #53bis, Warsaw, Poland, Jun. 30-Jul. 4, 2008.
Fujitsu; "DL System Level Performance Comparison between 2GHz and 3.5GHz for Advanced E-UTRA"; Agenda Item 12 (Study Item on LTE Advanced); R1-082579; 3GPP TSG-RAN1 #53-bis; Warsaw, PL, Jun. 30-Jul. 4, 2008.
Fujitsu; "Efficient HARQ Protocol for SIC based DL CoMP"; Agenda Item 11.4; R1-084294; 3GPP TSG-RAN1 #55; Prague, Czech Republic, Nov. 10-14, 2008.
Qualcomm Europe; "Network MIMO for Downlink Transmission in LTE-Advanced"; Agenda Item 12; 3GPP TSG-RAN WG1 #54, R1-083192; Jeju, South Korea; Aug. 18-22, 2008.
Notice of Rejection Grounds issued for corresponding Japanese Patent Application No. 2012-243649, drafted Jun. 19, 2013, with English translation.
Notice of Rejection Grounds issued for corresponding Japanese Patent Application No. 2012-243650, drafted Jun. 19, 2013, with English translation.
Notice of Rejection Grounds issued for corresponding Japanese Patent Application No. 2012-274083, drafted Jun. 20, 2013, with English translation.
Notice of Rejection Grounds issued for corresponding Japanese Patent Application No. 2012-274108, drafted Jun. 19, 2013, with English translation.
Office Action issued for corresponding Canadian Patent Application 2,741,498, dated Jun. 10, 2013.
LG Electronics, "Network MIMO in LTE-Advanced", Agenda Item 11; 3GPP TSG RAN WG1 Meeting #54bis; R1-083653; Prague, Czech Republic, Sep. 29-Oct. 3, 2008.
First Notification of Office Action issued for corresponding Chinese Patent Application No. 200880131655.5, dated Mar. 20, 2013, with English translation.
Extended European Search Report issued for corresponding international application No. EP 08 87 7683.6 dated Nov. 8, 2013.

(56) References Cited

OTHER PUBLICATIONS

Nortel, "Reference signal design for downlink MIMO in LTE-advanced", Agenda Item: 11, Sep. 29-Oct. 3, 2008, R1-083871, 3GPP TSG-RAN Working Group 1 Meeting #54bis, Prague, Czech Rep.
Japanese Office Action issued for corresponding Japanese Patent Application No. 2013-225882, dated Dec. 17, 2013, with an English translation.
Patent Examination Report No. 1 issued for corresponding Australian Patent Application No. 2013201021, dated Aug. 12, 2013.
Huawei et al.: "CoMP clarification of definitions and TP", Agenda Item: 11, Sep. 29-Oct. 3, 2008, 3GPP TSG RAN WG1 #54 bis, R1-083906, Prague, Czech Republic.
LG Electronics, Network MIMO in LTE-Advanced, 3GPP TSG RAN WG1 Meeting #54bis R1-083653, Oct. 3, 2008.
Examiner's First Report issued for corresponding Australian Patent Application No. 2011 211 383 dated Feb. 27, 2012.
Extended European Search Report issued for corresponding international application No. EP 08 87 7683.6 dated Aug. 11, 2013.
Non-Final Office Action issued by the United States Patent and Trademark Office for corresponding U.S. Appl. No. 14/098,207, dated Apr. 25, 2014.
Non-Final Office Action issued by the United States Patent and Trademark Office for corresponding U.S. Appl. No. 13/093,394, dated Mar. 13, 2014.
Decision on Grant issued for corresponding Russian Patent Application No. 2011120185/08, dated Jul. 24, 2012, with an English translation.
Decision on Grant issued for corresponding Russian Patent Application No. 2012141576/08, dated Mar. 25, 2014, with an English translation.
Decision on Grant issued for corresponding Russian Patent Application No. 2012141645/08, dated Feb. 24, 2014, with an English translation.
Non-Final Office Action issued by the United States Patent and Trademark Office for corresponding U.S. Appl. No. 14/091,006, dated Apr. 24, 2014.
Final Office Action issued by the United States Patent and Trademark Office for corresponding U.S. Appl. No. 13/093,394 dated Jun. 26, 2014.
Final Office Action issued by the United States Patent and Trademark Office for corresponding U.S. Appl. No. 14/091,006 dated Jul. 8, 2014.
Final Office Action issued by the United States Patent and Trademark Office for corresponding U.S. Appl. No. 14/098,207 dated Jul. 9, 2014.
Advisory Action issued by the United States Patent and Trademark Office for corresponding U.S. Appl. No. 13/093,394 dated Sep. 26, 2014.
Office Action issued for corresponding Canadian Patent Application No. 2,741,498, dated Jul. 15, 2014.
Notice of Rejection Grounds issued for corresponding Japanese Patent Application No. 2013-225887, dated Sep. 24, 2014, with an English translation.
Alcatel Shanghai Bell et al., "Collaborative MIMO for LTE-Advanced Downlink", Agenda Item: 12, 3GPP TSG RAN WG1 Meeting #54, R1-082812, Jeju, Korea, Aug. 18-22, 2008.
LG Electronics, "Network MIMO in LTE-Advanced", Agenda Item: 12, 3GPP TSG RAN WG1 Meeting #54, R1-082942, Jeju, Korea, Aug. 18-22, 2008.
Extended European search report with European search opinion issued for corresponding European Patent Application No. 14166571.1 dated Sep. 30, 2014.
Non-Final Office Action issued by the United States Patent and Trademark Office for corresponding U.S. Appl. No. 13/093,394 dated Nov. 20, 2014.
Non-Final Office Action issued by the United States Patent and Trademark Office for corresponding U.S. Appl. No. 14/091,006 dated Nov. 21, 2014.
Non-Final Office Action issued by the United States Patent and Trademark Office for corresponding U.S. Appl. No. 14/098,207 dated Nov. 21, 2014.
Final Office Action issued by the United States Patent and Trademark Office for corresponding U.S. Appl. No. 13/093,394 dated Mar. 6, 2015.
Non-Final Office Action issued by the United States Patent and Trademark Office for corresponding U.S. Appl. No. 14/091,006 dated Jul. 2, 2015.
First Notification of Office Action issued for corresponding Chinese Patent Application No. 201310225278.4. dated Oct. 27, 2015 with a full English translation.
Final Office Action issued by the United States Patent and Trademark Office for corresponding U.S. Appl. No. 14/091,006 dated Nov. 19, 2015.
Final Office Action issued by the United States Patent and Trademark Office for corresponding U.S. Appl. No. 14/098,207 dated Nov. 23, 2015.
Final Office Action issued by the United States Patent and Trademark Office for corresponding U.S. Appl. No. 13/093,394 dated Nov. 19, 2015.
Non-Final Office Action issued by the United States Patent and Trademark Office for corresponding U.S. Appl. No. 13/093,394 dated Jul. 2, 2015.
Non-Final Office Action issued by the United States Patent and Trademark Office for corresponding U.S. Appl. No. 14/098,207 dated Jul. 6, 2015.
Communication pursuant to Article 94(3) EPC issued for corresponding European Patent Application No. 14 166 571.1 dated Aug. 7, 2015.
First Notification of Office Action issued for corresponding Chinese Patent Application No. 201310225276.5 dated Aug. 5, 2015 with a full English translation.
Office Action issued for corresponding Canadian Patent Application No. 2,741,498 dated Jun. 25, 2015.
Second Notification of Office Action issued for corresponding Chinese Patent Application No. 201310225129.8 dated Jun. 1, 2016 with a full English translation.
Second Notification of Office Action issued for corresponding Chinese Patent Application No. 201310225277.X dated Jun. 24, 2016 with a full English translation.
Final Office Action issued by the United States Patent and Trademark Office for corresponding U.S. Appl. No. 14/091,006 dated Jul. 27, 2016.
Final Office Action issued by the United States Patent and Trademark Office for corresponding U.S. Appl. No. 14/098,207 dated Jul. 27, 2016.
Final Office Action issued by the United States Patent and Trademark Office for corresponding U.S. Appl. No. 13/093,394 dated Jul. 27, 2016.
Non-Final Office Action issued by the United States Patent and Trademark Office for corresponding U.S. Appl. No. 13/093,394 dated Apr. 7, 2016.
Non-Final Office Action issued by the United States Patent and Trademark Office for corresponding U.S. Appl. No. 14/091,006 dated Apr. 14, 2016.
Non-Final Office Action issued by the United States Patent and Trademark Office for corresponding U.S. Appl. No. 14/098,207 dated Apr. 14, 2016.
Third Notification of Office Action issued by the State Intellectual Property Office of China for corresponding Chinese Patent Application No. 201310225129.8, dated Jan. 24, 2017, with an English translation.
USPTO Office Action (Notice of Decision from Post-Prosecution Pilot Program (P3) Conference) dated Oct. 6, 2016 for U.S. Appl. No. 14/098,207.
Third Notification of Office Action issued by the State Intellectual Property Office of China for corresponding Chinese Patent Application No. 201310225278.4, dated Feb. 4, 2017, with an English translation.

(56) References Cited

OTHER PUBLICATIONS

Third Notification of Office Action issued by the State Intellectual Property Office of China for corresponding Chinese Patent Application No. 201310225277.X, dated Feb. 3, 2017, with an English translation.
Examiner's answer issued by the United States Patent and Trademark Office for corresponding U.S. Appl. No. 14/098,207, dated Jun. 21, 2017.
Non-Final Office Action issued by the United States Patent and Trademark Office for corresponding U.S. Appl. No. 15/402,645, dated May 17, 2017.
Extended European search report with supplementary European search report and the European search opinion issued by the European Patent Office for corresponding European Patent Application No. 17166090.5, dated Jul. 26, 2017.
Final Office Action issued by the United States Patent and Trademark Office for corresponding U.S. Appl. No. 15/402,645, dated Dec. 4, 2017.
Decision of Rejection issued by the State Intellectual Property Office of China for corresponding Chinese Patent Application No. 201310225278.4, dated Jul. 4, 2017, with an English translation.
Advisory Action Before the Filing of an Appeal Brief issued by the United States Patent and Trademark Office for corresponding U.S. Appl. No. 15/402,645, electronically delivered on Jan. 23, 2018.
Office Action issued by Intellectual Property India for corresponding Indian Patent Application No. 1890/KOLNP/2011, dated Feb. 9, 2018, with an English translation.

\* cited by examiner

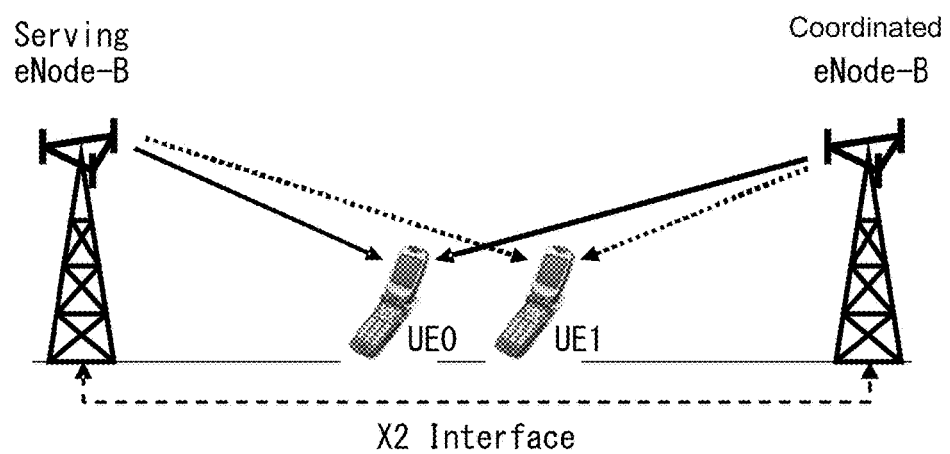
F I G. 1

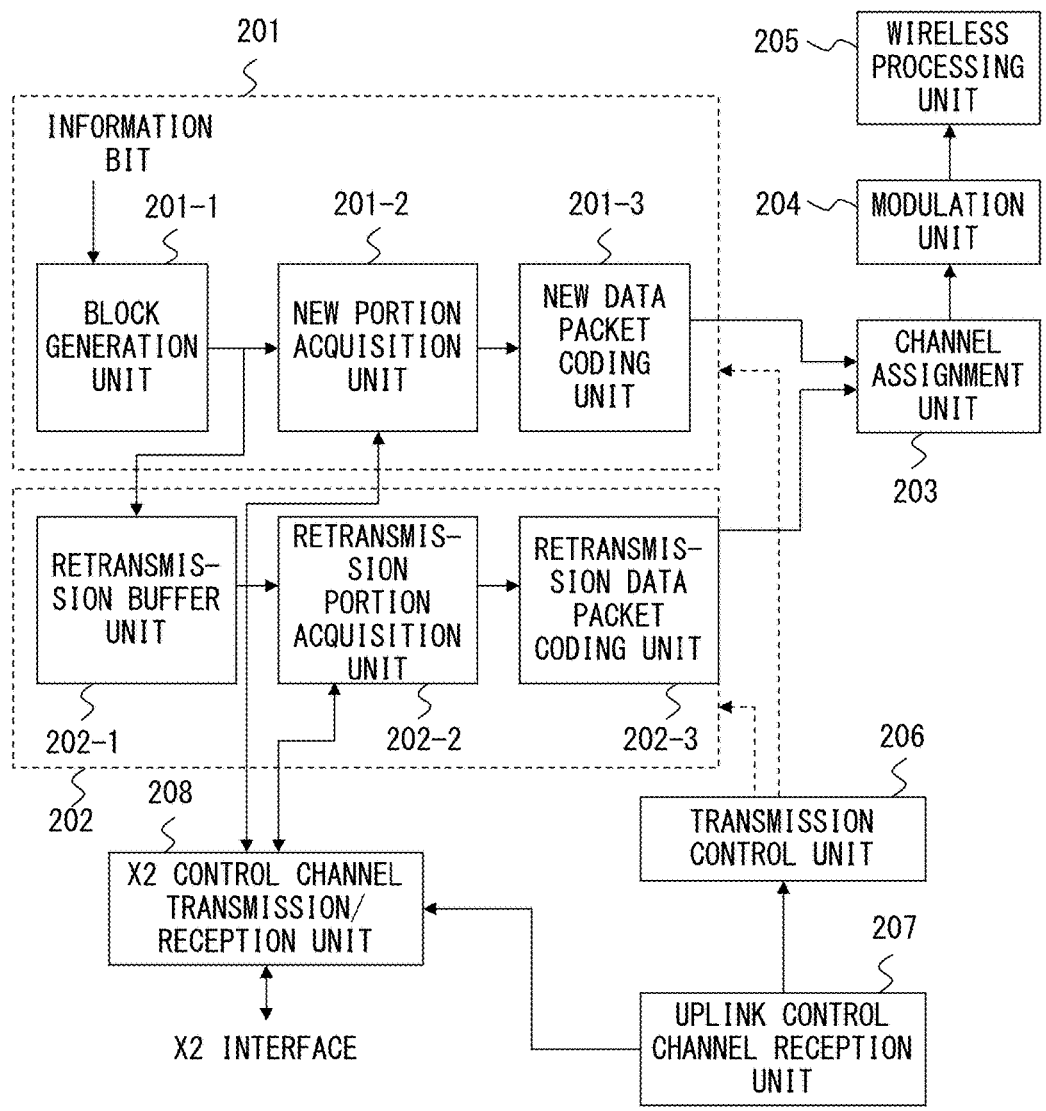
F I G. 2

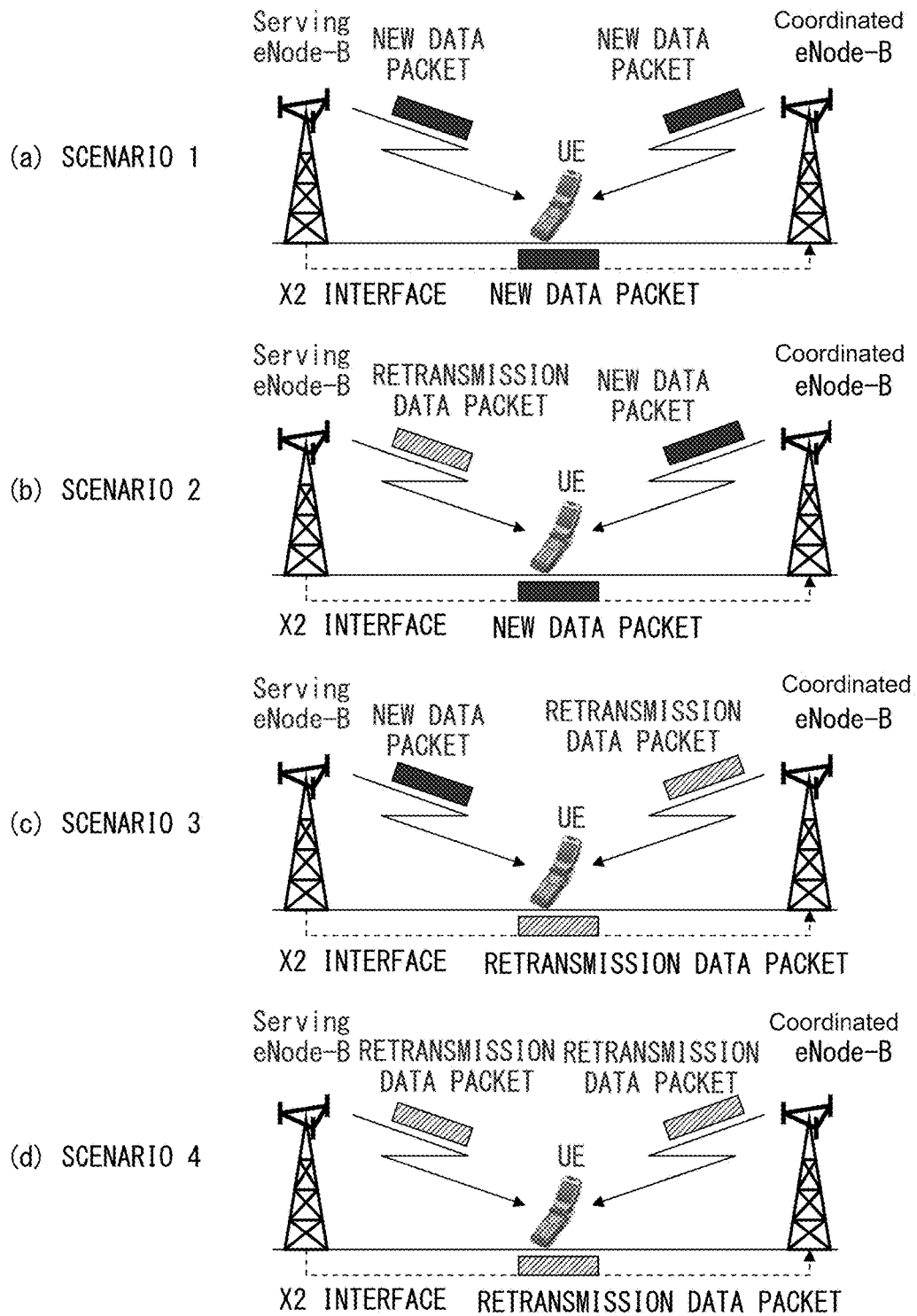
F I G. 4

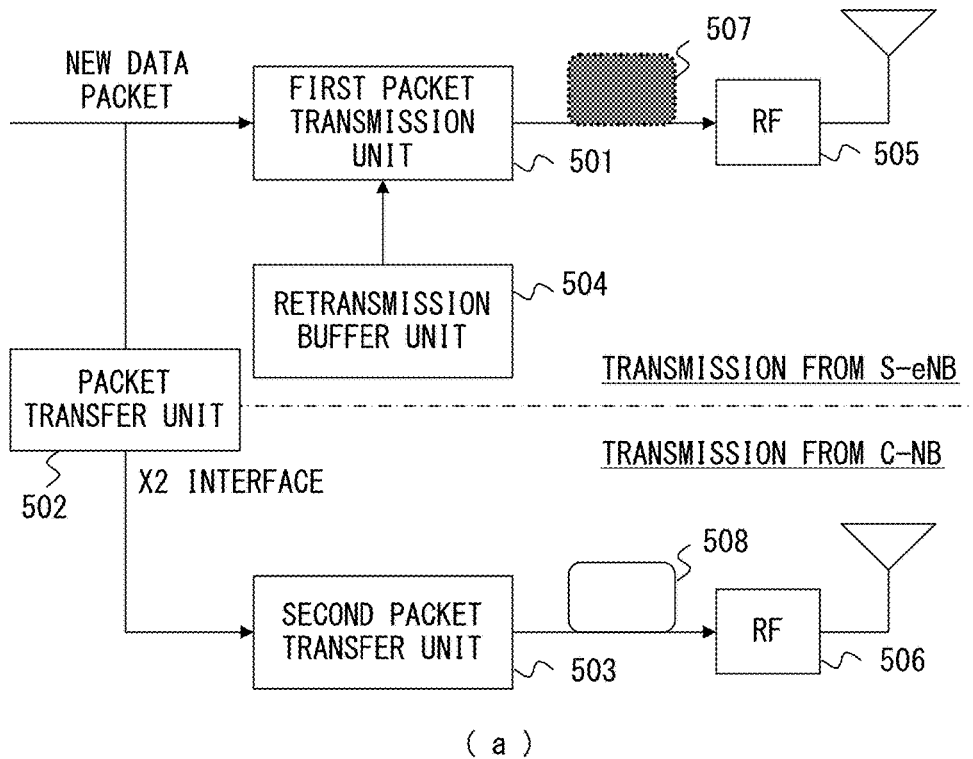
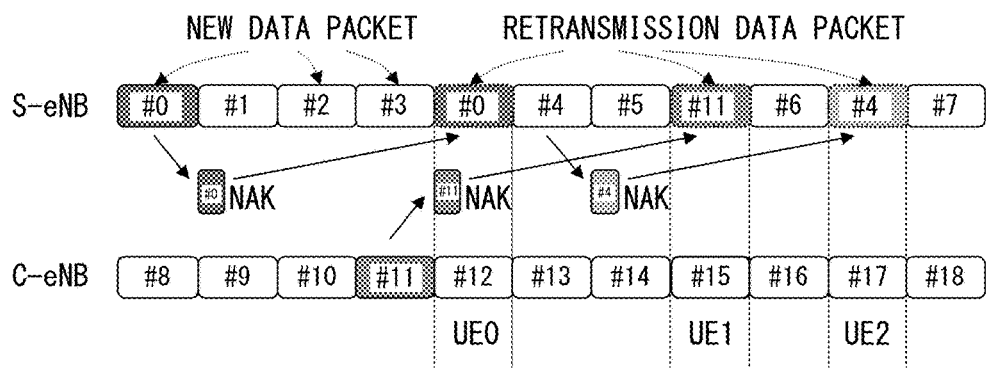
FIG. 5

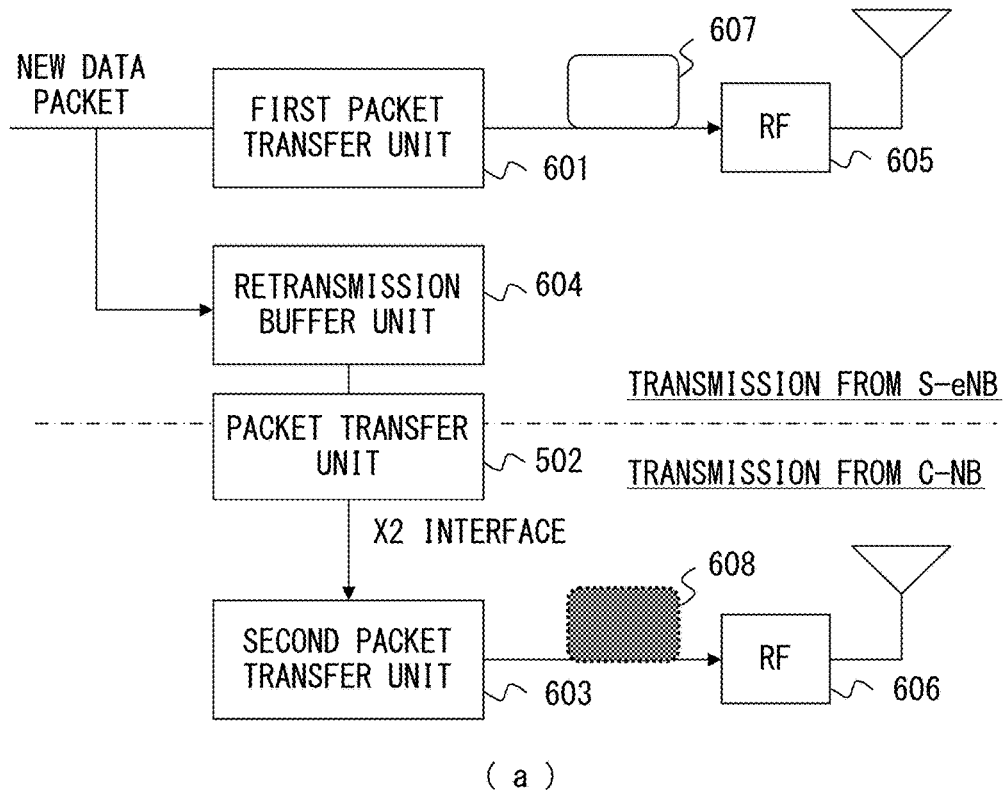
(a)
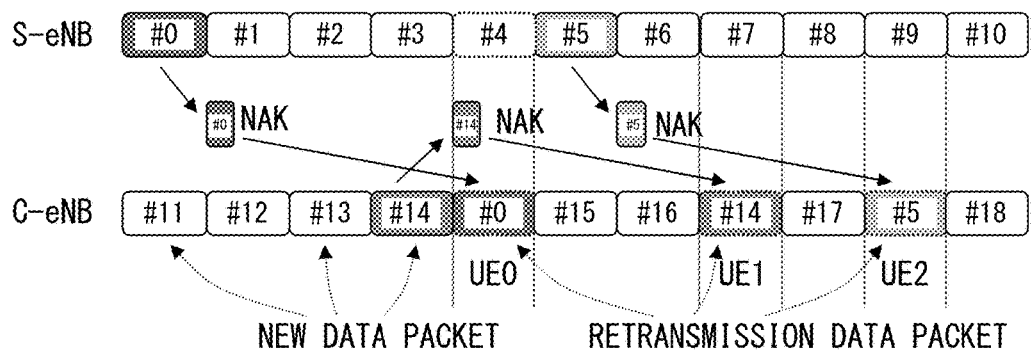
(b)
F I G. 6

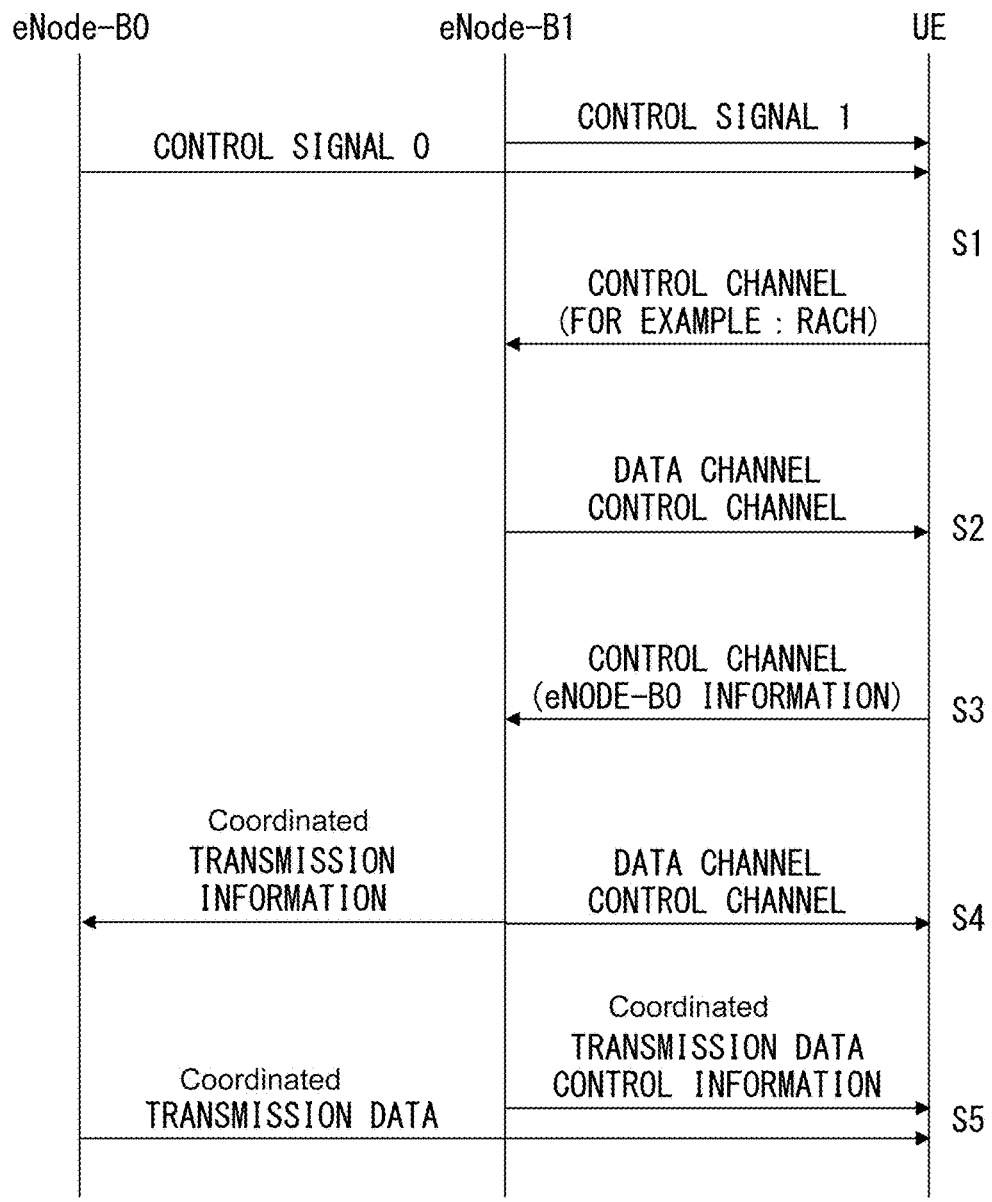
F I G. 7

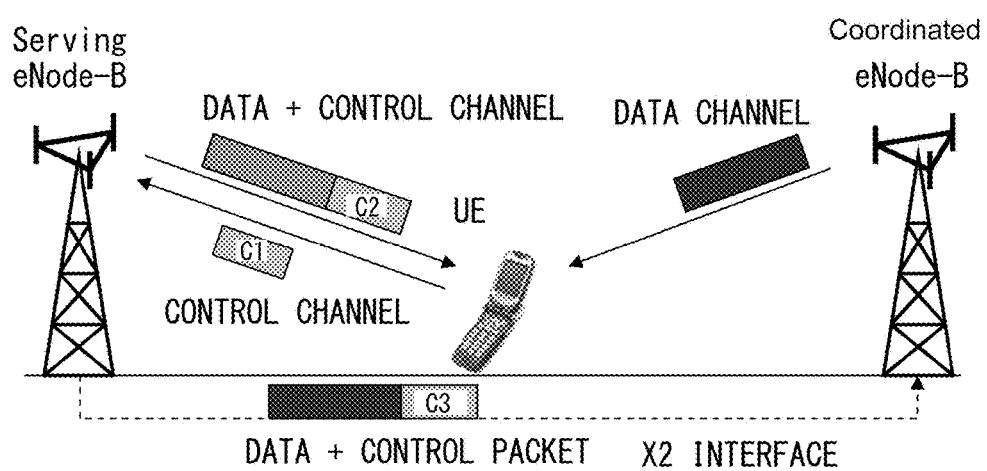
F I G. 8

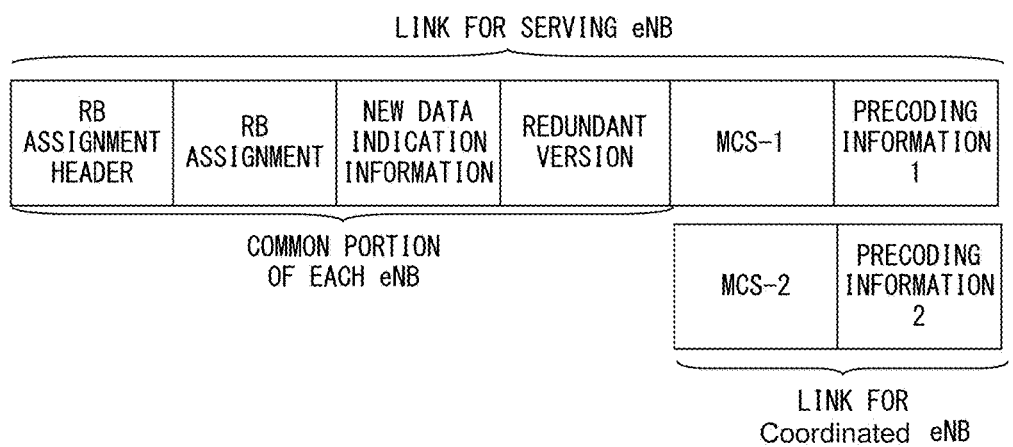
F I G. 9

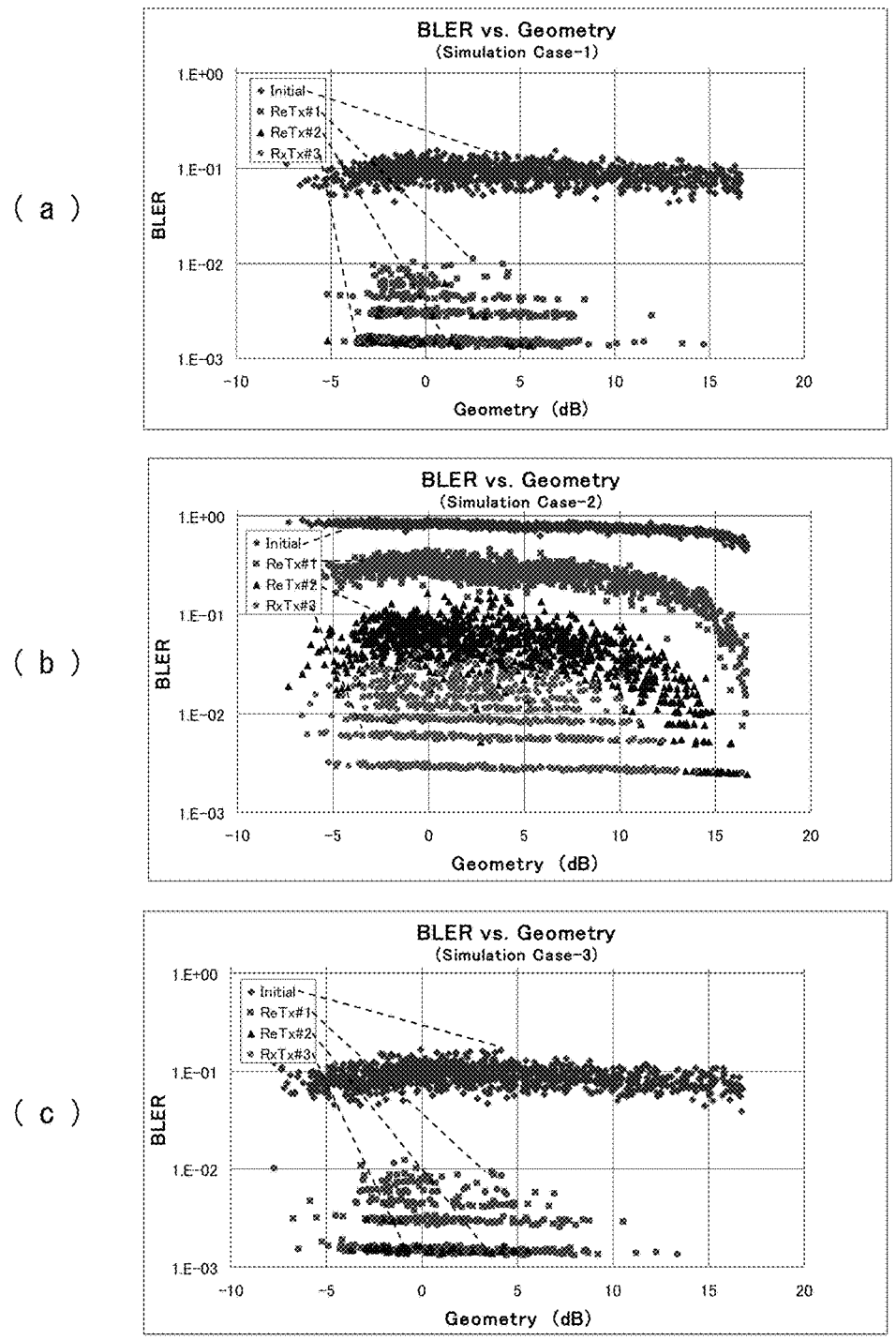
F I G. 1 1

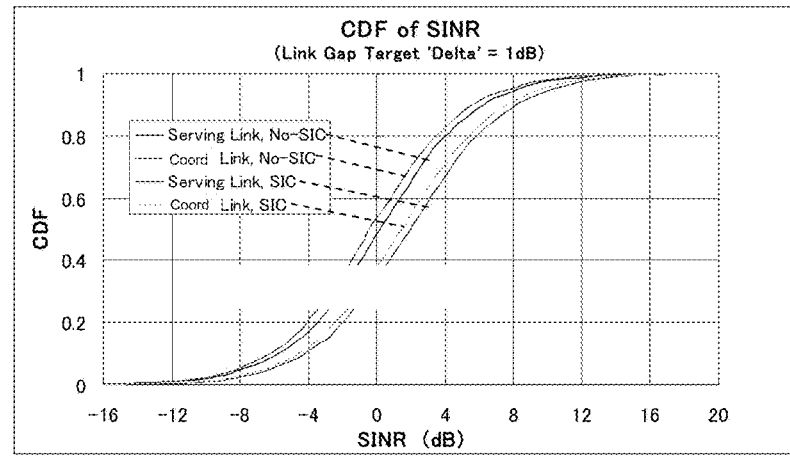
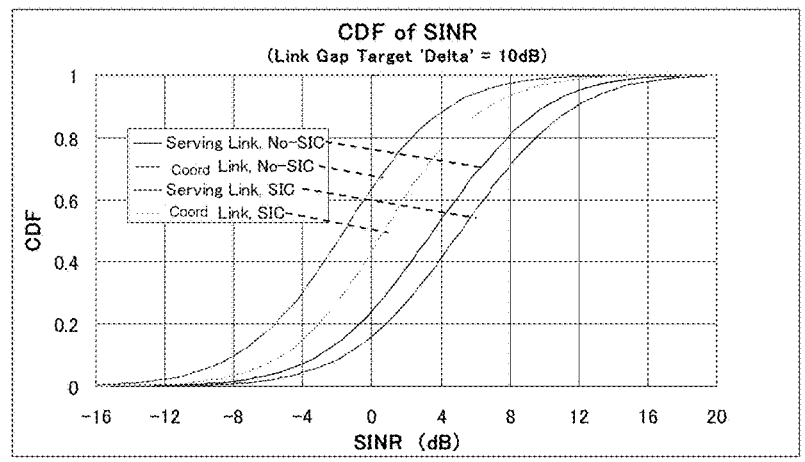
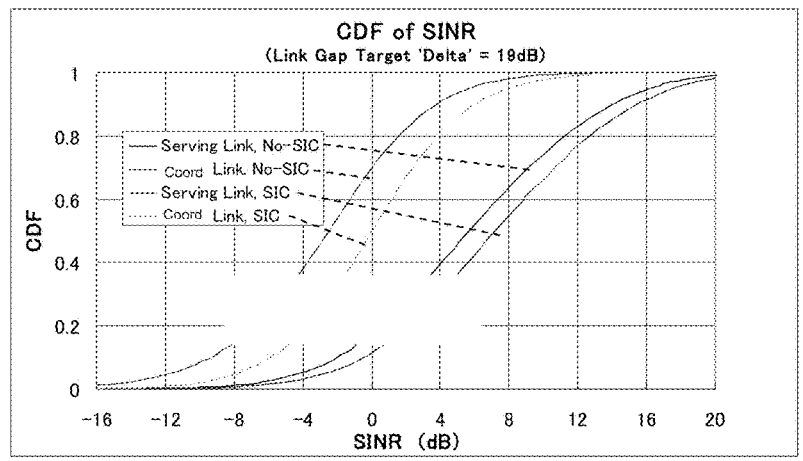
F I G. 1 2

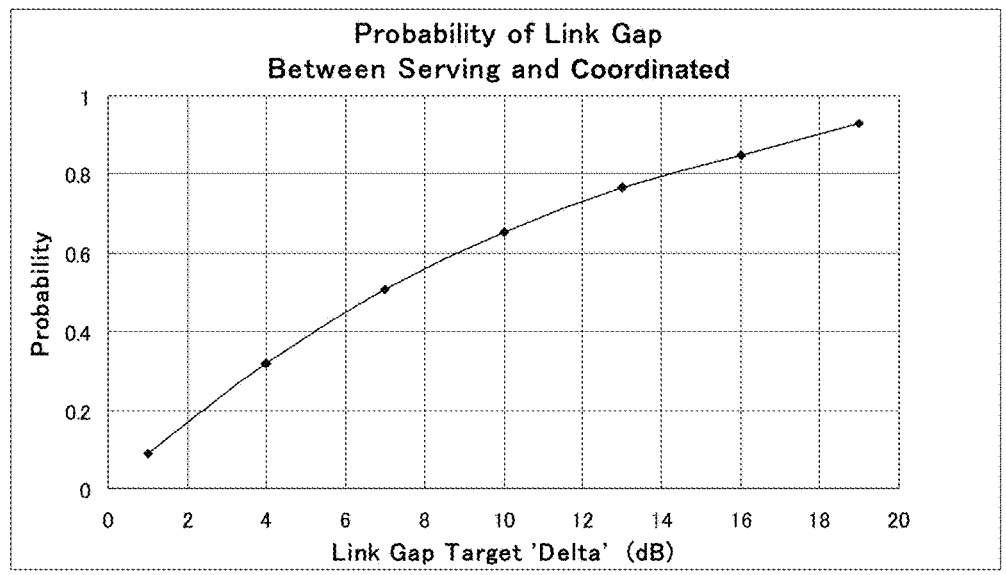
F I G. 13

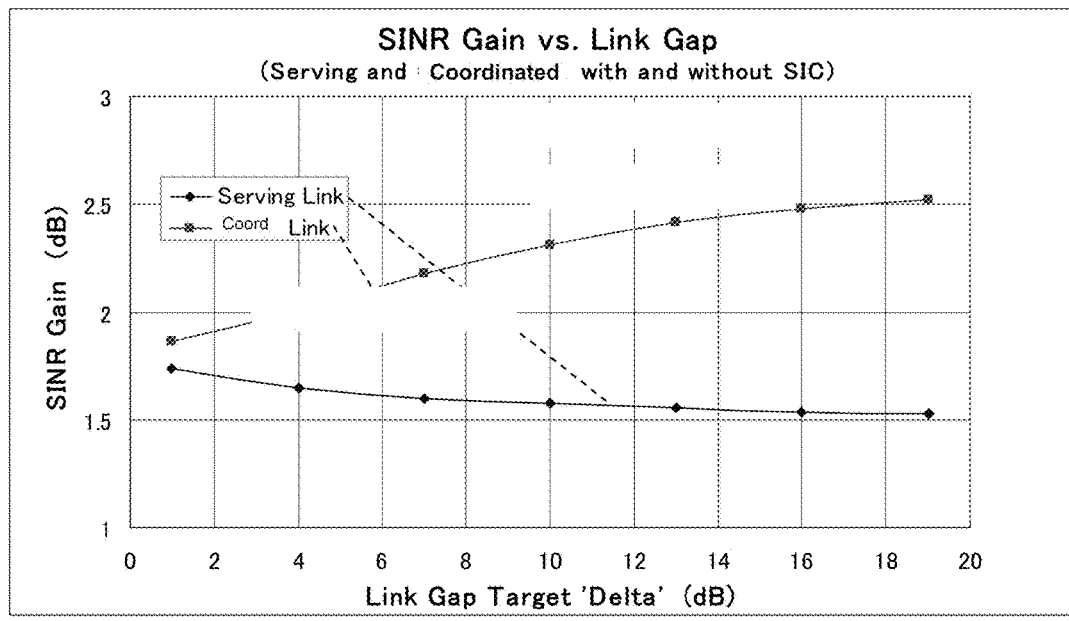
F I G. 15

WIRELESS BASE STATION DEVICE USING COORDINATED HARQ COMMUNICATION SYSTEM, WIRELESS TERMINAL DEVICE, WIRELESS COMMUNICATION SYSTEM, AND WIRELESS COMMUNICATION METHOD

CROSS-REFERENCE TO RELATED APPLICATIONS

This application is a continuation of U.S. application Ser. No. 13/093,394, filed on Apr. 25, 2011, now pending, which is a continuation application of International PCT Application No. PCT/JP2008/003080 which was field on Oct. 28, 2008, the contents of which are herein wholly incorporated by reference.

FIELD

The present invention relates to coordinated transmission system technology using a distributed antenna. Packet communication technology includes, for example, E-UTRA (Evolved Universal Terrestrial Radio Access) communication technology which has been studies as a next generation mobile telephone communication standard.

BACKGROUND

Relating to the spread-spectrum code division multiple access, widely studied is the soft handoff technology for preventing the communications from being interrupted by being transmitted and received the same signals simultaneously between two base stations when a mobile terminal moves from one cell to an adjacent cell. As the prior art relating to a coordinated transmission, for example, a system described in the patent document 1, the following non-patent document 1, etc. is disclosed. In the prior art, a coordinated transmission system for successfully increasing the link capacity is disclosed.

Based on a similar concept, a coordinated transmission system using a distributed antenna arranged in a different base station is proposed in relation to the multi-input and multi-output (MIMO) technology corresponding to macroscopic fading. As the prior art obtained by combining the MIMO technology and the coordinated transmission technology, for example, the systems described in the following non-patent documents 2 through 6 are proposed. These systems aim at attaining both a macroscopic diversity effect and a MIMO effect.

The discussions of the macroscopic diversity with a coordinated transmission have been made in a planning project of a new mobile telephone communication standard such the LTE (Long Term Evolution) etc. for which a standardizing operation is performed by a standardizing organization 3GPP (3rd Generation Partnership Project), for example. These discussions are disclosed by, for example, the following non-patent document 7. However, since it has been hard to distribute data of a high layer to different base stations, the coordinated transmission has not been realized, but a system of distributing data only to one base station has been used for simple implementation.

Recently, the LTE advanced standard as a next generation standard of the LTE has been developed as the fourth generation system (4G). In the standard, especially at a system performance request relating to the frequency efficiency for downlink (DL) and uplink (UL), a rather positive target is set. A practical discussion of the problem above has been disclosed in, for example, the following non-patent document 8.

To attain the above-mentioned target, some corporations have presented useful propositions about a beam forming transmission, intra-cell interference control, and relay control. In the propositions, the point of the discussion relating to the coordinated transmission has been taken up again to reconsider the possibility of the implementation. To be concrete, it is disclosed in, for example, the following non-patent document 9 or 10. In the LTE advanced, the target of the throughput of a user at the edge of a cell is set as approximately 1.4 times as high as that in the release 8 of the LTE communication standard. By taking this into account, the coordinated transmission system is expected as an important candidate in the LTE advanced technology.

Before adopting the coordinated transmission technology in the next generation communication standard such as the LTE advanced etc., there are a number of points to be discussed. It is, for example, a search of data and control channel, transmission timing, user packet scheduling, hybrid automatic repeat request (HARQ) process, etc. between eNodes-B through the X2 interface. The most important search among them is that relating to the HARQ.

In the LTE communication standard etc., the packet communication technology is required to enable the high-speed communications at a mobile terminal. In the packet communication, a reception device receives communication information while detecting an error based on the error correction code added to a communication packet by transmission device. Then, the reception device returns to the transmission device an ACK (acknowledgement) or a NAK (negative acknowledgement) about the reception status of the communication packet. The transmission device retransmits transmission information when the reception device returns a NAK or when no transmission status confirmation can be received before a certain period has passed after a packet is transmitted.

In the HARQ technology adopted in the LTE etc., for example, the retransmission pattern is determined on the transmission device side after considering that the data whose decoding has failed by the reception device is not discarded but decoded by a combination with retransmission data in the process of a layer 1 protocol hierarchical level of the LTE etc. On the reception device side, the data whose reception has failed is not discarded, but decoded by a combination with retransmission data. Thus, retransmission control is realized with high efficiency and high accuracy.

Therefore, in the next generation packet communication system, it is an important problem to determine how the HARQ is to be realized in the coordinated transmission system to realize a coordinated transmission system with a high diversity effect.

However, in the prior art disclosed as Patent Document 1 or non-patent documents 1 through 10, no practical technology for realizing the HARQ in the coordinated transmission has not been disclosed.

In addition, the system described in the following patent document 2 is disclosed as prior art obtained by combining the HARQ and the MIMO technology. Patent Document 2 refers to a practical system for realizing the HARQ in the packet transmission using a MIMO multiple transmission antenna.

However, the MIMO is based on that a plurality of antennas are accommodated in one base station while the coordinated transmission is based on that the antennas of a plurality of base stations arranged in a distributed manner perform a coordinated transmission in the downlink direction toward a mobile terminal. To realize a coordinated transmission including a HARQ between the base stations arranged in the distributed manner, it is necessary to solve the problems, which is not necessary in the MIMO, of the communication system for user data and channel data, timing, etc. among the base stations. Especially, the combination of a new data packet and a retransmission data packet in the HARQ with the coordinated transmission is not disclosed by the above-mentioned prior art, which remains as an unsolved problem.

Patent Document 1: National Publication of International Patent Application No. 2008-503974
Patent Document 2: National Publication of International Patent Application No. 2008-517484
Non-patent Document 1: A. J. Viterbi, A. M. Viterbi, K. S. Gilhousen, and E. Zehavi, "Soft handoff extends CDMA cell coverage and increases reverse link capacity", IEEE J. Sel. Areas Commun., vol. 12, pp. 1281-1288, October, 1994.
Non-patent Document 2: W. Roh and A. Paulraj, "MIMO channel capacity for the distributed antenna systems", in IEEE VTC' 02, vol. 3, pp. 1520-1524, September 2002.
Non-patent Document 3: Z. Ni and D. Li, "Impact of fading correlation and power allocation on capacity of distributed MIMO", IEEE Emerging technologies: Frontiers of Mobile and Wireless Communication, 2004, Volume 2, May 31-Jun. 2, 2004 Page(s): 697-700 vol. 2.
Non-patent Document 4: Syed A. Jafar, and S. Shamai, "Degrees of freedom region for the MIMO X Channel", IEEE Transactions on Information Theory, Vol. 54, No. 1, pp. 151-170, January 2008.
Non-patent Document 5: D. Wang, X. You, J. Wang, Y. Wang, and X. Hou, "Spectral Efficiency of Distributed MIMO Cellular Systems in a composite Fading Channel", IEEE International conference on, Communications, 2008. ICC '08, pp. 1259-1264, May 19-23, 2008.
Non-patent Document 6: O. Simeone, O. Somekh; H. V. Poor, and S. Shamai, "Distributed MIMO in multi-cell wireless systems via finite-capacity links", Communications, Control and Signal Processing, 2008. ISCCSP 2008. 3rd International Symposium on, pp. 203-206, Mar. 12-14, 2008.
Non-patent Document 7: 3GPP TR 25.814 v7.0.0. Physical layer aspects for evolved UTRA, release-7, June 2006.
Non-patent Document 8: 3GPP TR 36.913 V7.0.0. Requirements for Further Advancements for E-UTRA, release-8, V8.0.0, June 2008.
Non-patent Document 9: 3GPP TSG RAN WG1 Meeting #53bis Warsaw, Poland, "Collaborative MIMO for LTE-A downlink", Jun. 30-Jul. 4, 2008, R1-082501.
Non-patent Document 10: 3GPP TSG RAN WG1 Meeting #53bis Warsaw, Poland, "Network MIMO Precoding", Jun. 30-Jul. 4, 2008, R1-082497

SUMMARY

The problem of the present invention is to realize an appropriate and efficient HARQ process in the coordinated transmission system.

The aspect described below is based on the wireless communication system in which the first wireless base station device and the second wireless base station device perform a coordinated transmission process to allow the wireless terminal device not to discard a packet on which decoding has failed but to combine the packet with a retransmitted packet and decode the resultant packet while controlling the retransmission of a packet according to the transmission status information returned from the wireless terminal device, the wireless base station device or the wireless terminal device which belong to the wireless communication system, or the wireless communication method for realizing the process.

A first packet transmission unit transmits as a first packet a new data packet or a retransmission data packet corresponding to a retransmit request from the first wireless base station device to the wireless terminal device when the retransmit request is issued to the coordinated transmission process by the wireless terminal device.

A packet transfer unit transfers the information about a second packet different from the first packet between the new data packet and the retransmission data packet from the first wireless base station device to the second wireless base station device. The packet transfer unit performs a transfer process using, for example, an X2 interface regulated between the first wireless base station device and the second wireless base station device.

The second packet transmission unit transmits the second packet according to the information transferred from the packet transfer unit in synchronization with the transmission process of the first packet by the first packet transmission unit from the second wireless base station device to the wireless terminal device when the retransmit request is issued.

With the above-mentioned configuration, each of the first wireless base station device and the second wireless base station device has a retransmission buffer unit, and the first wireless base station device can be configured to hold the information about the packet on which a coordinated transmission process is performed for the wireless terminal device in the retransmission buffer unit in the first wireless base station device, and the second wireless base station device can be configured not to hold the information about the packet on which the coordinated transmission process is performed for the wireless terminal device in the retransmission buffer unit in the second wireless base station device.

With the above-mentioned configuration, the first packet can be configured as a retransmission data packet, and the second packet can be configured as a new data packet. In this instance, the packet transfer unit reads the information about the retransmission data packet from the retransmission buffer unit in the first wireless base station device, and transfers the information to the second wireless base station device. The packet transfer unit transfers, for example, the communication control information relating to the second wireless base station device for communication between the first wireless base station device and the wireless terminal device and the information relating to the transmission timing of the second packet by the second wireless base station device.

With the configurations up to the aspects above, a control information communication unit for communicating the control information about the communication by the first wireless base station device to the wireless terminal device and the control information about the communication by the second wireless base station device to the wireless terminal device between the first wireless base station device and the wireless terminal device can be further included. For example, the control information communication unit can perform the transmission of control information from the first wireless base station device to the wireless terminal device through a physical downlink control channel and perform the transmission of the control information from the wireless terminal device to the first wireless base station device through a physical uplink control channel. The physical uplink control channel in this case includes at least, for example, the individual channel quality indication information for each of the first wireless base station device and the second wireless base station device, and the precoding matrix indication information and the rank indication information common to the first wireless base station device and the second wireless base station device. In addition, the physical downlink control channel includes at least, for example, the individual modulation and coding scheme information and the individual precoding information for each of the first wireless base station device and the second wireless base station device.

With the configuration described above, the control information from the wireless terminal device to the first wireless base station device can be configured to include the transmission status information (HARQ-ACK/NAK) indicating a reception result of the packet from the first wireless base station device and a reception result of the packet from the second wireless base station device, respectively.

With the configuration above, the first wireless base station device can be configured to centrally control at least the assignment of a wireless terminal device, the assignment of communication resources, and the control of transmission timing associated with the coordinated transmission process.

The wireless terminal device for performing the communication by the wireless communication system having the above-mentioned configuration has the following aspects.

A retransmission data packet reception unit performs a receiving process on a retransmission data packet when a retransmit request is issued.

When the retransmission data packet reception unit successfully performs the receiving process on the retransmission data packet, a new data packet reception unit performs a successive interference cancellation process on the received signal received by the wireless terminal device through the retransmission data packet on which the receiving process has been successfully performed, and the receiving process of a new data packet according to a resultant received signal is performed.

With the configuration of the aspect of the wireless terminal device, a coordinated transmission process determining unit for determining whether or not the coordinated transmission process is to be performed and determining the first wireless base station device and the second wireless base station device for performing the process when the execution of the transmission process is determined can be further included. For example, the coordinated transmission process determining unit makes a determination according to the information about the reception power for the reference signal to be received from each wireless base station device currently in communication.

BRIEF DESCRIPTION OF DRAWINGS

FIG. 1 is an explanatory view of a network model based on which the present embodiment is designed;
FIG. 2 is a configuration of an embodiment of the transmission device;
FIG. 4 is an explanatory view of grouping cases in which two eNodes-B coordinately operate;
FIG. 5 is an explanatory view of the coordinated downlink HARQ transmission system for a scenario 2;
FIG. 6 is an explanatory view of the coordinated downlink HARQ transmission system for a scenario 3;
FIG. 7 is an example of an operation sequence of a determining process of a serving eNB and a coordinated eNB;
FIG. 8 is an explanatory view of a data channel and a control channel;
FIG. 9 is an example of a data format of a UCI and a DCI;
FIG. 11 is a graph indicating the a BLER to geometry for each UE on the initial transmission, retransmission #1, #2, and #3 in the simulation result;
FIG. 12 is a graph indicating the CDF of the SINR to a S-eNB and a C-eNB with and without SIC in the simulation result;
FIG. 13 is a graph indicating the probability of a link gap between a serving eNB and a coordinated eNB;
FIG. 15 is a graph indicating the gain to link gap by the cancellation between the serving eNB and the coordinated eNB at the CDF point of 0.5.

DESCRIPTION OF EMBODIMENTS

The best embodiments are described below in detail with reference to the attached drawings.

First, the system network model is described according to the embodiments of the present invention.

FIG. 1 is an explanatory view of a network model based on which the present embodiment is designed.

To hold generalities, a network is configured as a packet communication system including two wireless base stations for coordinately performing a service on a wireless mobile terminal (UE: User Equipment) such as a mobile telephone terminal etc. A packet communication system can be realized as, for example, an E-UTRA (Evolved Universal Terrestrial Radio Access) system in accordance with the LTE communication standard on which a standardizing operation is performed by 3GPP.

In the LTE etc., a base station is referred to as an eNode-B (evolved Node B). In the present embodiment, in the description below, a base station is referred to as an eNode-B or an eNB for short.

As illustrated in FIG. 1, one of the two wireless base stations is a serving base station (serving eNode-B, hereinafter referred to as a "serving eNB" or a "S-eNB" for short), and the other is referred to as a coordinated base station (coordinated eNode-B, hereinafter referred to as a "coordinated eNB" or a "C-eNB" as necessary). The determination as to which the eNB belongs, a serving eNB or a coordinated eNB, depends on the long-period power intensity received by each UE. Therefore, the positioning of the eNB for each UE can be different. As a reasonable definition, the long-period power intensity from the serving eNB received by each UE is higher than that of the coordinated eNB.

Figure 3:
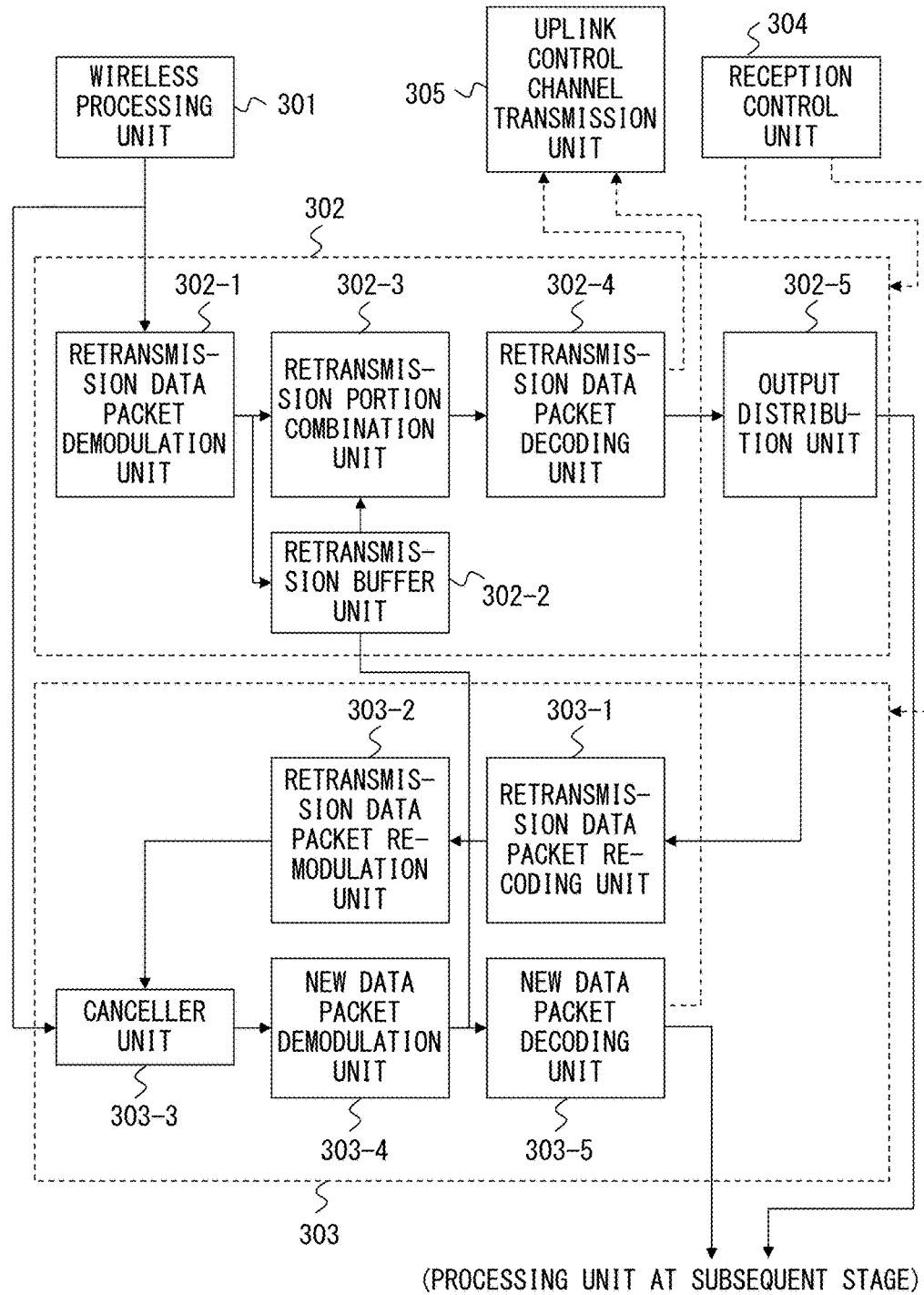
FIG. 3 is a configuration of an embodiment of the reception device.

FIG. 2 is a configuration of a packet transmission device according to an embodiment configured in the eNode-B on the network illustrated in FIG. 1. FIG. 3 is a configuration of a packet reception device according to an embodiment configured in the UE illustrated in FIG. 1. The transmission device in FIG. 2 is provided on the downlink side of the eNode-B, and the reception device in FIG. 2 is provided on the downlink side of the UE. The configuration of the transmission/reception device on the uplink channel side of the devices has a common configuration, and the detailed description is omitted here.

The transmission device illustrated in FIG. 2 includes a new data packet transmission unit 201, a retransmission data packet transmission unit 202, a channel assignment unit 203, a modulation unit 204, a wireless processing unit 205, a transmission control unit 206, an uplink control channel reception unit 207, and an X2 control channel transmission/reception unit 208. The new data packet transmission unit 201 is further configured by a block generation unit 201-1, a new portion acquisition unit 201-2, and a new data packet coding unit 201-3. The retransmission data packet transmission unit 202 is further configured by a retransmission buffer unit 202-1, a retransmission portion acquisition unit 202-2, and a retransmission data packet coding unit 202-3.

The reception device illustrated in FIG. 3 includes a wireless processing unit 301, a retransmission data packet reception unit 302, a new data packet reception unit 303, a reception control unit 304, and an uplink control channel transmission unit 305. The retransmission data packet reception unit 302 is further configured by a retransmission data packet demodulation unit 302-1, a retransmission buffer unit 302-2, a retransmission portion combination unit 302-3, a retransmission data packet decoding unit 302-4, and a output distribution unit 302-5. The new data packet reception unit 303 is further configured by a retransmission data packet re-coding unit 303-1, a retransmission data packet re-modulation unit 303-2, a canceller unit 303-3, a new data packet demodulation unit 303-4, and a new data packet decoding unit 303-5.

Described below in detail are the operations of the embodiments of the transmission device and the reception device with the above-mentioned configurations.

A very unique and important behavior for the HARQ can be the block error rate of normally 1% or less when a retransmission data packet is decoded after the HARQ combining process performed by the retransmission portion combination unit 305-3 illustrated in FIG. 2. In the embodiment illustrated in FIG. 2, in the successive interference cancellation process (SIC) performed by the canceller unit 303-3, a decoded retransmission data packet is positively used, thereby realizing an effective SIC process. That is, in the embodiment illustrated in FIG. 2, a retransmission packet is first detected in the UE, and then other packets (new or retransmission packets) are detected.

Next, in the present embodiment, one new packet and one retransmission packet are delivered in complete synchronization toward one UE from two coordinated operating eNodes-B which implement a transmission device of a downlink system illustrated in FIG. 1.

FIG. 4 is an explanatory view of grouping cases in which two eNodes-B coordinately operate. In this example, a coordinated transmission is grouped into four types of scenarios. Each scenario refers to a different channel resource assignment, and a different control channel design. For simplicity, the explanation here refers to the case of one UE only, but the scenario for a plurality of UEs is described later.

In the scenario 1 illustrated in FIG. 4(a), it is assumed that only a new data packet is delivered to a UE positioned at the cell edge from the serving eNB. To realize a macroscopic transmission coordinately, some new data packets are transferred from the serving eNB to the coordinated eNB through the X2 interface. Then, the new data packets are delivered simultaneously to a corresponding UE from both eNodes-B. On the UE side, the receiving process is performed while suppressing the interference from each other.

In the scenario 2 illustrated in FIG. 4(b) it is assumed that two types of transmission packet are delivered to the UE positioned at the cell edge. One is a retransmission data packet, and another packet is a new data packet. The retransmission data packet is delivered from a serving eNB to a UE simultaneously when the new data packet transferred from the serving eNB through an X2 interface is delivered from a coordinated eNB to a UE. In the UE, as described later, the new data packet reception unit 303 illustrated in FIG. 3 performs the receiving process while suppressing the interference from each other in the SIC process.

In the scenario 3 illustrated in FIG. 4(c), as in the scenario 2, the two types of transmission packets, that is, the retransmission data packet and the new data packet, are delivered. In the scenario 3, unlike the scenario 2, a new data packet is delivered from the serving eNB to the UE simultaneously when a retransmission data packet is delivered from the coordinated eNB to the UE. In this case, the retransmission data packet is transferred from the serving eNB to the coordinated eNB. In the UE, as described later, the new data packet reception unit 303 illustrated in FIG. 3 performs the receiving process while suppressing the interference from each other in the SIC process.

In the scenario 4 illustrated in FIG. 4(d), it is assumed that only the retransmission data packet is delivered from the serving eNB to the UE at the cell edge. To coordinately realize a macroscopic transmission, some retransmission data packets are transferred from the serving eNB to the coordinated eNB through the X2 interface. Then, the retransmission data packets are simultaneously delivered to the corresponding UE from both eNBs. The UE performs the receiving process while suppressing the interference from each other.

It is considered that the scenario 2 illustrated in FIG. 4(b) and the scenario 3 illustrated in FIG. 4(c) are better transmission systems for providing the highest diversity gain by a macroscopic transmission analysis and a cancellation gain by the SIC process because since the BLER (block error rate) for the retransmission data packet after a HARQ combination is sufficiently low, the retransmission data packet can be first extracted, and then the new data packet can be extracted by the SIC process, thereby acquiring a better result. Therefore, it is preferable that one new data packet and one retransmission data packet can be constantly acquired as a rule of the coordinated transmission, and they can be transmitted simultaneously from both the serving eNB and the coordinated eNB. According to the system level simulation result described later, it is certain that if an UE moves at the speed of 3 km/h, the probability of a retransmission is 8-10%. However, if it moves at the speed of 30 km/h, the probability of a retransmission increases up to 70-80%. Therefore, when there are terminal groups coexisting and moving at different speeds, the probability of retransmissions can be estimated as 30-40%. It means the possibility of the coordinated HARQ transmission between the new data packet and the retransmission data packet is 23-29%. It is considered that the probability that the scenario 1 illustrated in FIG. 4(a) as a normal coordinated transmission without a retransmission is approximately 70%. However, since the scenario 4 illustrated in FIG. 4(d) indicates a low occurrence probability of a HARQ packet, it does not occur in a practical system. Therefore, the probability that the scenario 4 is adopted is nearly zero.

By the search above, the description below is concentrated on the cases of the scenario 2 illustrated in FIG. 4(b) and the scenario 3 illustrated in FIG. 4(c) as an operation of the transmission device of the eNode-B downlink system illustrated in FIG. 2. One of these scenarios is selected and designed during the implementation. A more preferable scenario between them is described later.

FIG. 5 is an explanatory view of the coordinated downlink HARQ transmission system for the scenario 2.

First, in FIG. 5(b), if a new data packet received at the UE (for example, a new data packet #0) enters an erroneous state, the data is retransmitted from the serving eNB simultaneously with the new packet (for example, a new data packet #12) delivered from the coordinated eNB (C-eNB) to the synchronous transmission timing determined by the serving eNB (S-eNB). A similar process occurs with a retransmission packet #4 (or #11) transmitted with the new data packet #17 (or #15).

FIG. 5(a) is a block diagram of the configuration of the process of the transmission device for the scenario 2. When the transmission device in FIG. 2 is implemented as a downlink system on the serving eNB side, a retransmission buffer unit 504 on the serving eNB side in FIG. 5(a) corresponds to the retransmission buffer unit 202-1 illustrated in FIG. 2. A first packet transmission unit 501 on the serving eNB side corresponds to the portion excluding the retransmission buffer unit 202-1 in the retransmission data packet transmission unit 202 illustrated in FIG. 2. Furthermore, an RF 503 on the serving eNB side corresponds to the portion configured by the channel assignment unit 203, the modulation unit 204, and the wireless processing unit 205 illustrated in FIG. 2. On the other hand, when the transmission device is implemented as a downlink system on the coordinated eNB side, the second packet transfer unit 503 on the coordinated eNB side in FIG. 5(a) corresponds to the new data packet transmission unit 201 in FIG. 2. An RF 505 on the coordinated eNB side corresponds to the portion configured by the channel assignment unit 203, the modulation unit 204, and the wireless processing unit 205 in FIG. 2. Furthermore, a packet transfer unit 502 for transferring a new data packet from the serving eNB to the coordinated eNB corresponds to an X2 control channel transmission/reception unit 108 illustrated in FIG. 2.

As understood from the process configuration described above, when the serving eNB and the coordinated eNB each having a transmission device of a downlink system illustrated in FIG. 2 operate according to the scenario 2, the first packet transmission unit 501 performs an operation of transmitting a retransmission data packet 507 in the transmission device on the serving eNB side. On the other hand, in the transmission device on the coordinated eNB side, the second packet transfer unit 503 performs the operation of transmitting a new data packet 508 corresponding to the information transferred from the serving eNB by the packet transfer unit 502.

FIG. 6 is an explanatory view of the coordinated downlink HARQ transmission system for the scenario 3.

First, in FIG. 6(b), when the new data packet (for example, a new data packet #0) received by the UE enters an erroneous state, the data is transferred through the X2 interface along a corresponding control channel to the coordinated eNB. Then, it is retransmitted from the coordinated eNB simultaneously with a new packet (for example, a new data packet #4) delivered from the serving eNB to the synchronous transmission timing determined by the serving eNB. A similar process is generated with a retransmission packet #5 (or #14) transmitted with a new data packet #9 (or #7).

FIG. 6(a) is a block diagram of the process configuration of the transmission device for the scenario 3. When the transmission device in FIG. 2 is implemented as a downlink system on the serving eNB side, a retransmission buffer unit 604 on the serving eNB side in FIG. 6(a) corresponds to the retransmission buffer unit 202-1 in FIG. 2. A first packet transfer unit 601 on the serving eNB side corresponds to the new data packet transmission unit 201 in FIG. 2. Furthermore, an RF 605 on the serving eNB side corresponds to the portion configured by the channel assignment unit 203, the modulation unit 204, and the wireless processing unit 205. On the other hand, when the transmission device in FIG. 2 is implemented as a downlink system on the coordinated eNB side, the second packet transfer unit 603 on the coordinated eNB side in FIG. 6(a) corresponds to the portion excluding the retransmission buffer unit 202-1 in the retransmission data packet transmission unit 202 in FIG. 2. In addition, an RF 605 on the coordinated eNB side corresponds to the portion configured by the channel assignment unit 203, the modulation unit 204, and the wireless processing unit 205 in FIG. 2. Furthermore, a packet transfer unit 602 for transferring a retransmission data packet from the retransmission buffer unit 604 in the serving eNB to the coordinated eNB corresponds to the X2 control channel transmission/reception unit 108 in FIG. 2.

As understood from the process configuration described above, when the serving eNB and the coordinated eNB each having a transmission device of a downlink system illustrated in FIG. 2 operate according to the scenario 3, the first packet transmission unit 601 performs an operation of transmitting a new data packet 607 in the transmission device on the serving eNB side. On the other hand, in the transmission device on the coordinated eNB side, the second packet transfer unit 603 performs the operation of transmitting a retransmission data packet 608 corresponding to the information transferred from the retransmission buffer unit 604 in the serving eNB by the packet transfer unit 502.

With respect to the entire complexity, the scenario 2 is more preferable than the scenario 3 because, according to the scenario 2, the coordinated eNB receives a new block transferred from the serving eNB through the X2 interface, and can deliver a new data packet generated based on the received block without considering whether or not the packet has been correctly received on the UE side as described later in the explanation of the control channel. As described later, the serving eNB is totally responsible including the control channel access for the receiving process and the HARQ. This simplifies the design of the coordinated eNB. However, it is obvious that the configuration of the scenario 3 can be adopted.

Described below is a further detailed operation of the transmission device in FIG. 2 with the process of the scenarios 2 and 3 above.

In FIG. 2, the block generation unit 201-1 generates a block of a predetermined size from an information bit to be transmitted. The size of a block generated by the block generation unit 201-1 is equal to the amount of information bit which can be stored in one packet. That is, a normal packet to be transmitted by a transmission device includes information bits corresponding to one block.

The retransmission buffer unit 202-1 temporarily holds for a retransmission a block of the information bits generated by the block generation unit 201-1. The retransmission buffer unit 202-1 can sequentially discard the block which has been correctly decoded by the reception device and is not to be retransmitted.

The transmission control unit 206 controls the new portion acquisition unit 201-2 and the retransmission portion acquisition unit 202-2 according to the control signal received by the uplink control channel reception unit 207 from the UE side through a control channel.

Practically, when the transmission device in FIG. 2 operates as a serving eNB for a certain UE according to the scenario 1 (refer to FIG. 4(a)), and if a transmission of a retransmission data packet does not be instructed by the UE side, then the following operation is performed. That is, the transmission control unit 206 first instructs the new portion acquisition unit 201-2 to acquire a new block generated by the block generation unit 201-1 and corresponding to the UE to be processed, and output it to the new data packet coding unit 201-3 for a transmission. The transmission control unit 206 instructs the retransmission portion acquisition unit 202-2 to stop the operation. Furthermore, the transmission control unit 206 instructs the new portion acquisition unit 201-2 to output the new block also to the X2 control channel transmission/reception unit 208, and transfer it also to the coordinated eNB corresponding to the UE to be processed.

On the other hand, when the transmission device in FIG. 2 operates as a coordinated eNB for a certain UE according to the scenario 1, and if the UE side does not instruct the serving eNB corresponding to the UE to transmit a retransmission data packet, then the following operation is performed. That is, the transmission control unit 206 instructs the new portion acquisition unit 201-2 to acquire a new block received by the X2 control channel transmission/reception unit 208 and transferred from the serving eNB corresponding to the UE to be processed, and output it to the new data packet coding unit 201-3 for a transmission.

Next, when the transmission device in FIG. 2 operates as a certain serving eNB for a UE according to the scenario 2 (refer to FIG. 4(b)), and if the number of received NAKs received for the certain UE by the uplink control channel reception unit 207 has reached a predetermined number, the following process is performed. That is, the transmission control unit 206 instructs the retransmission portion acquisition unit 202-2 to acquire a transmitted block (retransmission block) corresponding to the NAK held in the retransmission buffer unit 202, and output it to the retransmission data packet coding unit 202-3 for a retransmission. In addition, the transmission control unit 206 instructs the new portion acquisition unit 201-2 to acquire a new block generated by the block generation unit 201-1 and corresponding to the UE to be processed, and output it not to the new data packet coding unit 201-3 but to the X2 control channel transmission/reception unit 208 to transfer it to the coordinated eNB corresponding to the UE to be processed.

On the other hand, when the transmission device in FIG. 2 operates as a coordinated eNB for a certain UE according to the scenario 2, and if the number of received NAKs received by the uplink control channel reception unit 207 in the serving eNB corresponding to the certain UE has reached a predetermined number, then the following process is performed. That is, the transmission control unit 206 instructs the new portion acquisition unit 201-2 to acquire a new block received by the X2 control channel transmission/reception unit 208 and transferred from the serving eNB corresponding to the UE to be processed, and output it to the new data packet coding unit 201-3 for a transmission.

When the transmission device in FIG. 2 operates as a serving eNB for a certain UE according to the scenario 3 (FIG. 4(c)), and if the number of received NAKs received by the uplink control channel reception unit 207 for the UE has reached a predetermined number, then the following process is performed. That is, the transmission control unit 206 instructs the retransmission portion acquisition unit 202-2 to acquire a transmitted block (retransmission block) corresponding to the NAK held in the retransmission buffer unit 202 to output it not to the retransmission data packet coding unit 202-3 but to the X2 control channel transmission/reception unit 208 and transfer it to the coordinated eNB corresponding to the UE to be processed. The transmission control unit 206 instructs the new portion acquisition unit 201-2 to acquire a new block generated by the block generation unit 201-1 and corresponding to the UE to be processed, and output it to the new data packet coding unit 201-3 for a retransmission.

On the other hand, when the transmission device in FIG. 2 operates as a coordinated eNB for a certain UE according to the scenario 3, and if the number of received NAKs received by the uplink control channel reception unit 207 in the serving eNB corresponding to the certain UE has reached a predetermined number, then the following process is performed. That is, the transmission control unit 206 instructs the retransmission portion acquisition unit 202-2 to acquire a retransmission block received by the X2 control channel transmission/reception unit 208 and transferred from the serving eNB corresponding to the UE to be processed, and output it to the retransmission data packet coding unit 202-3 for a transmission.

An ACK and a NAK are control signals stored with user data, transferred from a certain UE to be processed, and received by the uplink control channel reception unit 207 in the transmission device operating as a serving eNB for the certain UE as uplink control information (UCI) described later. These ACK and NAK indicate whether or not a reception error of a packet has occurred in the UE, and is returned from the UE to the corresponding serving eNB for each received packet.

In the transmission device in FIG. 2, when a new block is input from the new portion acquisition unit 201-2, the new data packet coding unit 303-1 in the new data packet transmission unit 201 generates a new packet in which the new block is included in an information bit section and a corresponding parity bit is included in a parity bit section.

When a retransmission block is input from the retransmission portion acquisition unit 202-2, the retransmission data packet coding unit 202-3 in the retransmission data packet transmission unit 202 generates a retransmission packet in which the retransmission block is included in an information bit section and a corresponding parity bit is included in a parity bit section.

The channel assignment unit 203 assigns the new packet generated by the new data packet coding unit 201-3 or the retransmission packet generated by the retransmission data packet coding unit 202-3 to a communication channel corresponding to the UE to be processed, and outputs the resultant frame data to the modulation unit 204.

The modulation unit 204 modulates the frame data output from the channel assignment unit 203, and outputs the data to the wireless processing unit 205.

The wireless processing unit 205 performs a predetermined wireless transmitting process on the frame data after the modulation, and transmits the resultant data through an antenna not illustrated in the attached drawings.

Described next is the detailed operation of the reception device illustrated in FIG. 3 and implemented in the downlink system in the UE.

As illustrated in FIG. 3, the reception device is provided with the retransmission data packet reception unit 302 and the new data packet reception unit 303.

In FIG. 3, the reception control unit 304 can recognize whether a received packet is a new data packet or a retransmission data packet according to the new data indication information (refer to FIG. 9(b)) included in the downlink control information (DCI) transmitted from the serving eNB with the received packet through a physical downlink control channel as described later. The recognition is similar to the identification between the scenario 1 and the scenario 2, or between the scenario 1 and the scenario 3. The reception control unit 304 performs the identifying process based on the output of the retransmission data packet demodulation unit 302-1 which constantly performs the demodulating process.

By the identification, when the reception device operates according to the scenario 1 (FIG. 4(*a*)) described above, the retransmission data packet reception unit 302, the retransmission data packet re-coding unit 303-1, the retransmission data packet re-modulation unit 303-2, and the canceller unit 303-3 in the new data packet reception unit 303 do not operate, and the received signal received by the wireless processing unit 301 through an antenna passes through the canceller unit 303-3 in the new data packet reception unit 303 and enters the new data packet demodulation unit 303-4.

The new data packet demodulation unit 303-4 demodulates the received packet from each communication channel configuring the received signal input from the wireless processing unit 301, and outputs the received packet to the new data packet decoding unit 303-5.

The new data packet decoding unit 303-5 decodes the input new data packet, and outputs resultant new information bits to the processing unit at the subsequent stage but not illustrated in the attached drawings.

On the other hand, in the identifying process by the reception control unit 304, when the reception device illustrated in FIG. 3 operates as the scenario 2 (FIG. 4(*b*)) or the scenario 3 (FIG. 4(*c*)), both retransmission data packet reception unit 302 and new data packet reception unit 303 operate under the control of the reception control unit 304.

Described first is the operation of the retransmission data packet reception unit 302.

The retransmission data packet demodulation unit 302-1 demodulates the received packet from each communication channel configuring the received signal input from the wireless processing unit 301, and outputs the received packet to the retransmission portion combination unit 302-3. The retransmission data packet demodulation unit 302-1 performs a demodulating process regardless of whether the received packet is a retransmission data packet or a new data packet to enable the identifying process by the reception control unit 304.

With the timing of processing on a retransmission packet indicated by the reception control unit 304, the retransmission portion combination unit 302-3 combines the retransmission data packet input from the retransmission data packet demodulation unit 302-1 with the past data packet held in the retransmission buffer unit 302-2 after a first reception failure. Then, the retransmission portion combination unit 302-3 outputs the combination result to the retransmission data packet decoding unit 302-4. The reception control unit 304 receives retransmission sequence information and other control information as a part of downlink control information (DCI) transmitted with a received packet from the serving eNB through the physical downlink control channel, and notifies the retransmission portion combination unit 302-3 of these pieces of control information. The retransmission portion combination unit 302-3 performs the process of combining retransmission packets in the HARQ system according to the control information.

The retransmission data packet decoding unit 302-4 decodes the input retransmission data packet, and outputs the resultant reconstructed information bits to the output distribution unit 302-5.

When the information bits are successfully reconstructed, the output distribution unit 302-5 outputs them to the processing unit at the subsequent stage but not illustrated in the attached drawings. Simultaneously, the output distribution unit 302-5 outputs the reconstructed information bits to the retransmission data packet re-coding unit 303-1 in the new data packet reception unit 303.

Described next is the operation of the new data packet reception unit 303.

When the reconstructed information bits are input from the output distribution unit 302-5, the retransmission data packet re-coding unit 303-1 and the retransmission data packet re-modulation unit 303-2 are operated, and a replica of a successfully received retransmission data packet is generated.

The canceller unit 303-3 performs a cancelling process on the interference signal components in the retransmission data packet received from the serving eNB (in the case of the scenario 2) or the coordinated eNB (in the case of the scenario 3) for the received signal input from the wireless processing unit 301 as a successive interference cancellation process. Thus, the canceller unit 303-3 appropriately extracts only the received signal components of the new data packet received from the coordinated eNB (in the case of the scenario 2) or the serving eNB (in the case of the scenario 3), and outputs the result to the new data packet demodulation unit 303-4.

the new data packet demodulation unit 303-4 demodulates the received packet from each communication channel configuring the received signal from which the interference components input from the canceller unit 303-3 are removed, and outputs the received packet to the new data packet decoding unit 303-5.

The new data packet decoding unit 303-5 decodes the input new data packet, and outputs the resultant new information bits to the processing unit at the subsequent stage but not illustrated in the attached drawings.

If the reconstructing process on the retransmission data packet fails in the retransmission data packet reception unit 302, and no input is performed from the output distribution unit 302-5 to the retransmission data packet re-coding unit 303-1, then the input from the retransmission data packet re-modulation unit 303-2 to the canceller unit 303-3 is set to zero. Thus, the operation of the canceller unit 303-3 becomes invalid equivalently. As a result, the new data packet demodulation unit 303-4 and the new data packet decoding unit 303-5 extract a new data packet without the cancelling process.

In FIG. 3, the reception control unit 304 correctly recognizes the physical downlink control channel from the serving eNode-B described later according to, for example, the reference signal (RS) in the received signal. As an RS group between the serving eNB and the coordinated eNB, a signal group in which signals have the same patterns but different phase shifts, for example, those orthogonal to each other, can be used to easily identify the channel between the serving eNB and the coordinated eNB.

As an example of a variation of a system of processing the above-mentioned reception device, the following interactive system capable of improving the system performance can also be applied.

First, a retransmission data packet is extracted, and if it is correctly received, a new data packet is extracted in the SIC process by a canceller unit.

If the retransmission data packet is not successfully received, a new data packet is extracted. If the new data packet is correctly received, the retransmission data packet is extracted again in the SIC process by the canceller unit.

Thus, in the present embodiment, a retransmission data packet and a new data packet are assigned to the serving eNB and the coordinated eNB (in the case of the scenario 2) or inversely (in the case of the scenario 3) to perform a coordinated transmission, thereby successfully and simultaneously transmitting a retransmission data packet and a new data packet corresponding to the same UE using the same channel resources. Thus, in the coordinated transmission system according to the present embodiment, channels can also be effectively used.

The assignment of channel resources and the user scheduling for a coordinated transmission are centrally controlled by the transmission control unit 206 (FIG. 2) in the serving eNB. As an important parameter for determining whether or not a coordinated transmission is to be performed, a link gap $\Delta ue$ or, in place of it, a reference signal receiving power (RSRP) difference used as a term in the LTE is used. The parameter is defined as a difference of logarithm received signal powers between the serving eNB and the coordinated eNB in the UE. If the link gap $\Delta ue$ is smaller than the link gap target $\Delta$ as another parameter, the coordinated transmission is performed. Otherwise, a normal transmission is preferable. Using these parameters, a band width for a transmission can be easily controlled.

The reception control unit 304 in the reception device (FIG. 3) of the UE sequentially detects the RSRP difference of each received RS during communications, and notifies the serving eNB side of the result through the uplink control channel transmission unit 305. As a result, the uplink control channel reception unit 207 in the current serving eNB (FIG. 2) receives it, and the transmission control unit 206 (FIG. 2) determines whether or not the coordinated transmission is to be continued, determines a new serving eNB, etc.

Described above is the coordinated HARQ transmitting process relating to one UE, but each UE can identify the execution status of the coordinated transmission according to an RS signal group and identify the serving eNB and the coordinated eNB as described above. Thus, each eNode-B can control whether it functions as a serving eNB or a coordinated eNB for each UE, and can perform the same process as the process mentioned above.

FIG. 7 is an example of an operation sequence of a determining process of a serving eNB and a coordinated eNB. A UE determines, for example, the eNode-B1 as a serving eNB and the eNode-B0 as a coordinated eNB according to an RS signal group in the state in which communications with the eNode-B0 and the eNode-B1 are performed using, for example, control signals 0 and 1 (S1 in FIG. 7). Thus, the UE performs communications with the eNode-B1 using, for example, a random access channel RACH. Upon receipt of a notification of a data channel and a control channel from the eNode-B1 (S2 in FIG. 7), the UE notifies the eNode-B1 as a serving eNB of the information relating to the eNode-B0 as a coordinated eNB using the control channel (S3 in FIG. 7). As a result, a notification is issued from the eNode-B1 to the eNode-B0 using the X2 interface, and the eNode-B0 notifies the UE of the data channel and the control channel (S4 in FIG. 7). Thus, the UE can receive a coordinated transmission from the eNode-B1 and the eNode-B0. In this case, it receives a packet of coordinated transmission data and control information from the eNode-B1 as a serving eNB, and receives only the packet of coordinated transmission data from the eNode-B0 as a coordinated eNB.

Described next is the control channel communicated between a control channel designing eNode-B and the UE.

In the configuration of the present embodiment, an important control signal is communicated through a link between the serving eNB and the UE. That is, the link between the serving eNB and the UE is configured so that it has a more important function that the link between the coordinated eNB and the UE.

In designing a control channel, three channels are regarded. They are a physical uplink control channel (PUCCH), a physical downlink control channel (PDCCH), and an X2 control channel (X2CCH).

In addition, a control channel is designed according to the above-mentioned scenario 2 (FIG. 4(*b*)) because the scenario can provide better system performance and lower complexity for both the control channel and the data channel. The selection is confirmed in evaluating the system level simulation described later.

FIG. 8 is an explanatory view of a data channel and a control channel and their communication directions. The restrictions on the two types of channels are described below.

A new data packet can be transmitted on the two links, that is, from the serving eNB to the UE and from the coordinated eNB to the UE.

A retransmission packet can be transmitted only on the link from the serving eNB to the UE.

The PUCCH indicated as a C1 is transmitted on the link from the UE to the serving eNB.

The PDCCH indicated as a C2 is transmitted on the link from the serving eNB to the UE.

Only a new data packet and a control signal relating to the packet are delivered from the serving eNB to the coordinated eNB using the X2 interface. The control channel in the X2 interface is indicated as C3.

By the above-mentioned design of the control channel for the coordinated transmission, the amount of control channel can be exceedingly reduced, and the system latency can be considerably shortened by the HARQ process in a single direction. Described below in more detail is the design of each of the three channels.

First described is the design of the PUCCH.

In the design described below, the PUCCH corresponds to the uplink control information (UCI) including the following two periodic signals. One includes a channel quality indication (CQI), a precoding matrix indication (PMI), and a rank indication (RI), and expressed by CQI/PMI/RI. The other includes a HARQ-ACK/NAK. A PUCCH is transmitted only on the link from the UE to the serving eNB. In FIG. 8, it is indicated by C1. The PUCCH is terminated by the uplink control channel transmission unit 305 (FIG. 3) in the UE and the uplink control channel reception unit 207 (FIG. 2) in the eNode-B operating as a serving eNB. Each active UE separates the serving eNB and the coordinated eNB by, for example, a high layer control signal.

Each UE observes a channel response according to the reference signal (RS) from the serving eNB as well as the coordinated eNB. As described above, the phases of the RS of both NBs are set so that they can be orthogonal to each other. The uplink control channel transmission unit 305 (FIG. 3) in the UE notifies the uplink control channel reception unit 207 (FIG. 2) in the serving eNB corresponding to the UE of a periodical UCI. The CQI/PMI/RI included in the UCI corresponds to the quality of both links, that is, the link from the serving eNB to the UE and the link from the coordinated eNB to the UE. Then, the UCI is only transmitted to the corresponding serving eNB for the following two reasons.

Generally, the quality of the link from the serving eNB to the UE is better than the that from the coordinated eNB to the UE, which ensures the performance for the UL control channel.

It exceedingly reduces the amount of control channel, and simplifies the control channel design.

FIG. 9(a) illustrates a data format of an example of a UCI for both links. The format includes individual CQI for the respective links. It also includes corresponding PMI and RI. The field information corresponding to the PMI and RI is the same for both links.

The ACK or NAK (HARQ-ACK/NAK) included in the UCI for the HARQ process is the information about whether or not a reception error of a packet has occurred in the UE. The retransmission data packet decoding unit 302-4 and the new data packet decoding unit 303-5 in the reception device illustrated in FIG. 3 notifies the uplink control channel transmission unit 305 that it is necessary to retransmit a packet being processed when an error rate is equal to or higher than a predetermined threshold and the number of repetitions of a decoding process reaches a predetermined number in each decoding process. Thus, the uplink control channel transmission unit 305 transmits, to the serving eNB corresponding to the UE to which the unit belongs, a NAK for each received packet for which a retransmission is specified. In the case other than the above-mentioned condition, when the retransmission data packet decoding unit 302-4 and the new data packet decoding unit 303-5 successfully receive each received packet, the uplink control channel transmission unit 305 transmits an ACK for each received packet which has successfully received to the serving eNB corresponding to the UE including the unit.

The HARQ-ACK/NAK included in the UCI is received by the uplink control channel reception unit 207 (FIG. 2) in the serving eNB, and the information is passed to the transmission control unit 206. The transmission control unit 206 performs the retransmitting process on the HARQ as described above. In this case, it is preferable that the retransmitting process is performed only to the UE from the serving eNB as described in the scenario 2 for the following reasons.

The transmission latency in the HARQ process for a transmission packet can be reduced.

The control channels including the PDCCH and the X2CCH can be simplified.

The complexity for the coordinated eNB can be reduced because a transmitted new packet is not left in the retransmission buffer unit 302-2 (FIG. 2) arranged in the eNB. The coordinated eNB is only to transmit a new packet after the control channel (X2CCH) from the X2 interface.

The field of the HARQ-ACK/NAK on the PUCCH is designed to include the ACK/NAK signal (2 bits) corresponding to both of the serving eNB and coordinated eNB for the transmission data packet corresponding to both of the serving eNB and coordinated eNB.

Described next is the design of the PDCCH.

In the design, the PDCCH is transmitted only from the serving eNB to de destination UE so that it can be indicated as a C2 in FIG. 8. In this case, the PDCCH is terminated by the transmission control unit 206 (FIG. 2) in the eNode-B operating as a serving eNB and the reception control unit 304 (FIG. 3) in the UE.

That is, each UE decodes only the PDCCH from the serving eNB corresponding to the UE for the following two reasons.

The quality of the link from the serving eNB to the UE is better than that from the coordinated eNB to the UE. This ensures the performance for the control channel.

Transmitting the PDCCH from only one link considerably moderates the load of the control channel.

The downlink control information (DCI) transmitted through the PDCCH can indicate whether or not a coordinated transmission is currently being performed. For the purpose, a new bit is introduced to the DCI. As another expression, a PCI includes a bit identifying whether a transmission packet is a new data packet or a retransmission data packet, that is, whether it is the scenario 1 or the scenario 2, or whether it is the scenario 1 or the scenario 3. It is used to indicate the reception device to perform or not to perform the HARQ processing. The information can be attained by using the new data indication information (FIG. 9(b) described later) already prescribed and existing in the LTE standard.

Furthermore, the DCI includes the following information

In addition to the modulation and coding scheme (MCS) for the serving eNB in the format 1, format 1A, and format 1C, 5 bits of additional MCS for the coordinated eNB is required.

Additional MCS (5 bits) and precoding information in the format 2

The DCI for both links including the above-mentioned information is collectively encoded using the CRC specifying the UE. FIG. 9(b) is an example of the DCI using the format 2. In FIG. 9(b), the "RB assigning header" and the "RB assignment" are control information relating to the assignment of a resource block. The "new data indication information" is the information specifying whether a transmission packet is a new data packet or a retransmission data packet. A "redundant version" is the control information about a HARQ. The "MCS-1" and the "MCS-2" are the MCSs respectively for a serving eNB and a coordinated eNB. The precoding information 1 and the precoding information 2 are the precoding information respectively for the serving eNB and the coordinated eNB.

The PDCCH including the DCI is stored together with a user data packet in a subframe regulated in the data format in, for example, the E-UTRA communication system, and then transmitted.

Described next is the design of an X2 control channel.

Am X2 control channel (X2CCH) is delivered with a data packet corresponding to the control channel through the X2 interface indicated by C3 in FIG. 8. Practically, the X2CCH is terminated by the X2 control channel transmission/reception unit 208 in the transmission device illustrated in FIG. 2 of the serving eNB and the coordinated eNB. The X2CCH is realized on the cable link using, for example, optical fiber.

The X2CCH includes the following information.
Resource assignment header: 1 bit
Resource block assignment
Modulation and coding scheme: 5 bits
Precoding information
Transmission timing for subframe Described next is the timing control between the X2CCH and the PDCCH.

The transmission timing control is one of the most important problem for a coordinated transmission. It is determined by the serving eNB, and is instructed by the coordinated eNB through the X2 interface. The transmission timing is determined by considering the latency of the X2 interface.

Figure 10:
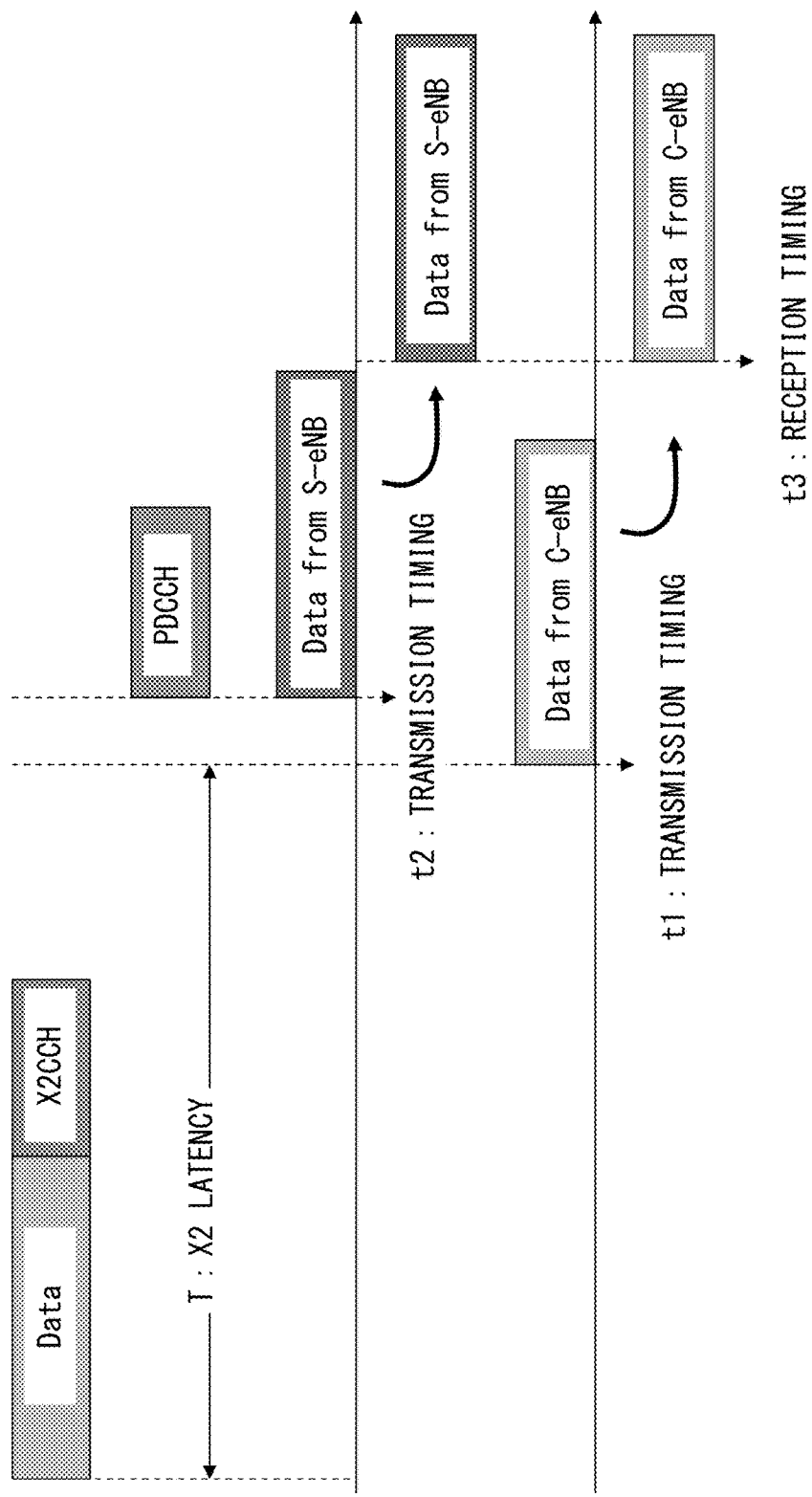
FIG. 10 is an example of the transmission timing between a control channel and a data channel.

FIG. 10 is an example of the transmission timing between a control channel and a data channel. In FIG. 10, the data and the corresponding X2CCH are transferred to the coordinated eNB prior to the relating transmission ("PDCCH" and "Data from S-eNB") from the serving eNB to the UE with the timing t2. The transmission timing t1 of the data from the coordinated eNB ("Data from C-eNB") is determined by the serving eNB based on the maximum latency T of the X2 interface. By the synchronous network between the serving eNB and the coordinated eNB, the data from the serving eNB and the data from the coordinated eNB are delivered with predetermined timing t1 and t2. It guarantees the reception of both data with the simultaneous timing t3.

Including the above-mentioned timing control, the coordinated transmission for each UE is centrally controlled by the serving eNB. The control includes the scheduling of the UE and data, and the transmission timing control.

A system level simulation has been performed to evaluate the performance of the above-mentioned coordinated HARQ transmission system according to the present embodiment.

In the system level simulation, a system loaded with the transmission device (FIG. 2) and the reception device (FIG. 3) according to the present embodiment is implemented in the cell network formed by 7 clusters. Each cluster is configured by 19 hexagonal cells, and each cell includes 3 sectors. The bore-sight point of the antenna of the sector is directed at the vertex of the hexagon. A surrounding inclusive network structure is adopted to generate an accurate model of the generation of interference from an external cell, the cluster to be observed is arranged at the center, and six copies are symmetrically arranged at the sides of the central cluster. Tables 1 and 2 respectively illustrate the simulation case grouping and condition assumption.

TABLE 1

MINIMAL SET OF UTRA AND EUTRA SIMULATIONS

| SIMU-LATION CASE | CF (GHz) | ISD (m) | BW (MHz) | PLoss (dB) | SPEED (km/h) | CHANNEL MODEL |
|---|---|---|---|---|---|---|
| 1 | 2.0 | 500 | 10 | 20 | 3 | TU |
| 2 | 2.0 | 500 | 10 | 10 | 30 | TU |
| 3 | 2.0 | 1732 | 10 | 20 | 3 | TU |

TABLE 2

CONDITION ASSUMPTION FOR SYSTEM LEVEL SIMULATION

| PARAMETER | VALUE |
|---|---|
| NUMBER OF CELLS | 19 |
| NUMBER OF SECTORS PER CELL | 3 |
| NUMBER OF UEs PER SECTOR | 20 |
| CENTRAL FREQUENCY | 2 GHz |
| TRANSMISSION POWER | 40 watt(46 dBm) |
| LOGARITHMIC SHADOWING | 8 dB |
| NOISE INDEX | 9 dB |
| eNB TRANSMISSION ANTENNA GAIN | 0 dBi |
| UE RECEPTION ANTENNA GAIN | 14 dBi |
| MAXIMUM CIR | 30 dB |
| PATH LOSS | 128.1 + 37.6log10(R), R in km |
| eNB-TO-UE CORRELATION | 0.5 |

TABLE 2-continued

CONDITION ASSUMPTION FOR SYSTEM LEVEL SIMULATION

| PARAMETER | VALUE |
|---|---|
| eNB-TO-UE MINIMUM DISTANCE | 35 METERS |
| THERMAL NOISE DENSITY | −174 dBm/Hz |
| eNB ANTENNA PATTERN | 70° BEAM WIDTH |
| UE ANTENNA PATTERN | Omni-Directional |
| UE RECEPTION DEVICE TYPE | MMSE |
| CHANNEL MODEL | TU |
| CHANNEL EVALUATION | IDEAL VALUE FROM RS |
| MCS OPERATION POINT | 10% BLER |

First, by evaluating the BLER (block error rate) of the HARQ system according to the present embodiment, a full system level simulation without a coordinated transmission is performed.

FIG. 11, in (a), (b), and (c), illustrates the BLER for each UE as the function of the geometry about the initial transmission and the retransmission #1, #2, and #3 respectively in the cases 1, 2, and 3.

Table 3 is a summary of the average BLER of the entire UE for the initial transmission and the retransmission #1, #2, and #3 in the cases 1, 2, and 3. The BLER for the initial transmission for the cases 1 and 3 is about 9%, and that for the case 2 is 78%. However, after the first retransmission, the BLER for the cases 1 and 3 is 0.1% or less, and that for the case 2 is 25%. Thus, when the reception device for performing an appropriate SIC process according to the present embodiment is introduced, it can be expected that the system performance for the coordinated transmission can be improved.

TABLE 3

AVERAGE BLER FOR INITIAL TRANSMISSION, RETRANSMISSION #1, #2, AND #3 IN CASES 1, 2, AND 3

| TRANSMISSION INDEX | CASE 1 | CASE 2 | CASE 3 |
|---|---|---|---|
| INITIAL TRANSMISSION | 9.11E−02 | 7.83E−01 | 8.89E−02 |
| RETRANSMISSION #1 | 1.21E−03 | 2.56E−01 | 1.20E−03 |
| RETRANSMISSION #2 | 6.54E−05 | 4.79E−02 | 6.27E−05 |
| RETRANSMISSION #3 | 7.69E−06 | 7.59E−03 | 0 |

Described next is the SINR gain from a reception device for performing a SIC process according to the present embodiment.

As described above, the link gap target $\Delta$ is an important parameter having an influence on the coordinated transmission. In the system level simulation, the parameter is used to control the band width between the coordinated eNBs. The motive of performing the system level simulation is to clarify the gain attained by the scenario 2 with respect to the scenario 3. First, the CDF (cumulative density function) of the reception SINR (signal-to-interference and noise power ratio) in the coordinated transmission user for various set values of the link gap target $\Delta$, or 1 dB, 10 dB, and 19 dB is plotted. Thus, the SINR at the CDF point of 0.5 can be illustrated. This enables the merit of the SINR from the scenario 2 to be correctly indicated.

The explanatory legends of the plot graphics are defined as follows.

Serving link, No-SIC: SNR (signal-to-noise ratio) or SNR gain received by a UE from the serving eNB (or a serving link) when there is no SIC cancelling process of the interference from the coordinated eNB (or the coordinated link). It corresponds to the scenario 3.

Coord link, No-SIC: SNR or SNR gain received by a UE from the coordinated eNB (or a coordinated link) when there is no SIC cancelling process of the interference from the serving eNB (or the serving link). It corresponds to the scenario 2.

Serving link, SIC: SNR or SNR gain received by a UE from the serving eNB (or a serving link) when there is a SIC cancelling process of the interference from the coordinated eNB (or the coordinated link). It corresponds to the scenario 3.

Coord link, SIC: SNR or SNR gain received by a UE from the coordinated eNB (or a coordinated link) when there is a SIC cancelling process of the interference from the serving eNB (or the serving link). It corresponds to the scenario 2.

FIG. 12, in (a), (b), and (c), illustrates the CDF of the SINR received by the UE in each case of the reception from the serving eNB and the coordinated eNB, in each case of with and without the SIC, and in each case of with each set value of Δ, or 1 db, 10 dB, and 19 dB. As the link gap target increases, the link quality between the serving eNB and the UE becomes better. In addition, the SIC process by the canceller unit 303-3 (FIG. 3) operates in a better condition with respect to the link between the coordinated eNB and the UE.

FIG. 13 is a graph indicating the probability of a UE falling into a link gap target Δ and determined as a cell edge user. For the UE, a coordinated transmission is performed. When the link gap target Δ indicates a reasonable value about, for example, 8 dB, the rate of the cell edge user is about 60%, which is sufficiently large value, and requires a coordinated transmission.

Figure 14:
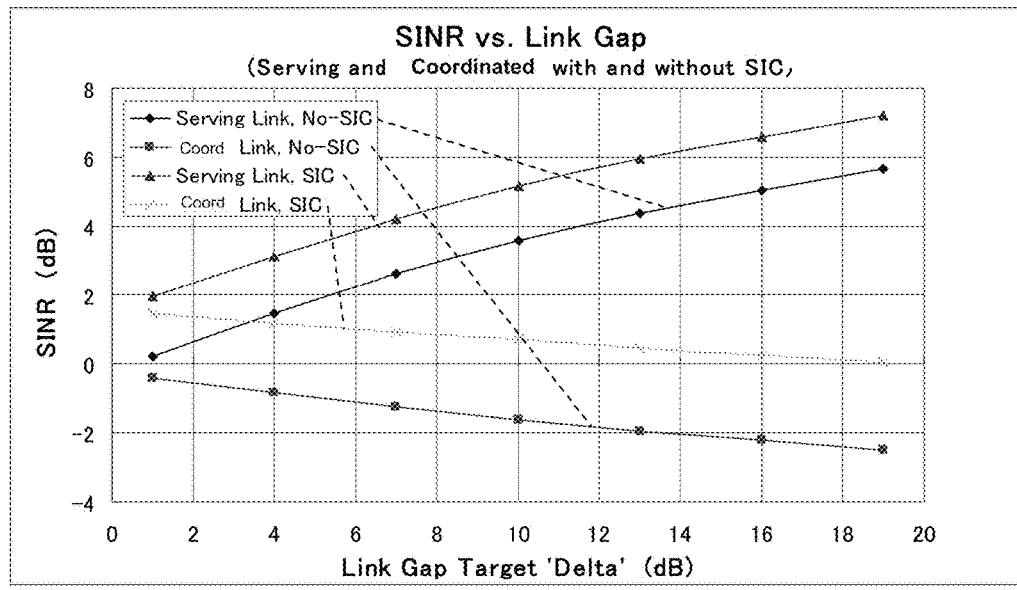
FIG. 14 is a graph indicating the SINR to link gap between a serving eNB and a coordinated eNB with and without SIC at the CDF point of 0.5.

FIG. 14 is a graph indicating the SINR of the UE as a function of the value of Δ as a function of the link gap target Δ when the CDF value is 50%. FIG. 15 is a result of calculating the SINR gain of the UE for the two links with and without SIC in addition to the conditions of FIG. 14.

By comparing the link (link 1) from the coordinated eNB to the UE with the link (link 2) from the serving eNB to the UE, some observation results are obtained as follows.

When a retransmission data packet is delivered from the serving eNB, the SINR gain for the link 1 in the SIC process is about 2 through 2.5 dB.

When the retransmission data packet is delivered from the coordinated eNB, the SINR gain for the link 2 in the SIC process is about 1.5 through 1.75 dB.

When the value of Δ increases, the SINR gain of the link 1 becomes larger, and the SINR gain of the link 2 becomes smaller. Thus, it is preferable that the value of Δ is not too small or large. In addition, a small value of Δ causes a too small possibility of a coordinated transmission, and a large value of Δ causes a too large possibility of a coordinated transmission. An appropriate value of Δ is between 8 dB and 10 dB. As a conclusion based on the study of the SINR gain by the SIC, the retransmission data packet is to be delivered constantly from the serving eNB.

The present application has proposed the coordinated transmission system for the HARQ process to again a high SINR gain using the reception device for performing the SIC process.

The present application realizes the SIC process more easily by using the unique behavior of the HARQ constantly indicating a low BLER after the combination of HARQs.

To attain high SINR gain by the SIC process, it is preferable that a retransmission data packet is eventually delivered on the link constantly from the serving eNB to the UE and a new data packet is delivered on the link from the coordinated eNB to the UE during the delivery. However, it is obvious that an inverse process can be used.

Relating to a control channel, three channels, that is, a physical uplink control channel (PUCCH), a physical downlink control channel (PDCCH), and a X2 control channel (X2CCH), are regarded by considering the feasibility and the facility. The design of the control channels can exceedingly reduce the amount of control channel, and considerably shorten the system latency.

The above-mentioned coordinated transmission system can also be applied to an intra-eNode-B in which a coordinated transmission occurs between two transmission points in the same eNode-B.

Described below is an example of a configuration of the hardware of a wireless base station. A wireless base station includes a wireless IF (interface), a processor, memory, a logical circuit, a cable IF, etc. The wireless IF is an interface device for performing wireless communications with a wireless terminal. The processor is a device for processing data, and includes, for example, a CPU (central processing unit), a DSP (digital signal processor), etc. The memory is a device for storing data, and includes, for example, ROM (read only memory), RAM (random access memory), etc. The logical circuit is an electronic circuit for performing a logical operation, and includes, for example, an LSI (large scale integration), an FPGA (field-programming gate array), etc. The cable IF is an interface device for performing cable communications with other wireless base stations connected to a network (what is called a backhaul network) on the network side of a mobile telephone system.

The correspondence between the wireless base station illustrated in FIG. 2 and the hardware is described below for example. The wireless IF corresponds to, for example, the wireless processing unit 205. The processor, the memory, and the logical circuit correspond to, for example, the new data packet transmission unit 201, the retransmission data packet transmission unit 202, the channel assignment unit 203, the modulation unit 204, the transmission control unit 206, and the uplink control channel reception unit 207. The cable IF corresponds to, for example, the X2 control channel transmission/reception unit 208.

Described below is an example of a configuration of the hardware of a wireless terminal. A wireless terminal includes a wireless IF (interface), a processor, memory, a logical circuit, an input IF, an output IF, etc. The wireless IF is an interface device for performing wireless communications with a wireless base station. A processor is a device for processing data, and includes, for example, a CPU (central processing unit), a DSP (digital signal processor), etc. The memory is a device for storing data, and includes, for example, ROM (read only memory), RAM (random access memory), etc. The logical circuit is an electronic circuit for performing a logical operation, and includes, for example, an LSI (large scale integration), an FPGA (field-programming gate array), etc. The input IF is a device for inputting data, and includes, for example, an operation button, a mike, etc. The output IF is a device for outputting data, and includes, for example, a display, a speaker, etc.

The correspondence between the wireless terminal illustrated in FIG. 3 and the hardware is described below for example. The wireless IF corresponds to, for example, the wireless processing unit 301. The processor, the memory, and the logical circuit correspond to, for example, the retransmission data packet reception unit 302, the new data packet reception unit 303, the reception control unit 304, and the uplink control channel transmission unit 305.

What is claimed is:

1. A wireless communication system comprising:
a wireless terminal device; and
a plurality of wireless base station devices which include a first wireless base station device and a second wireless base station device and which perform a coordinated transmission to the wireless terminal device, wherein:
the first wireless base station device includes a transmitter configured to transmit to the wireless terminal device a first control channel which indicates new data or retransmission data and which indicates a resource for receiving data coordinately transmitted from the second wireless base station device, the first control channel transmitted only from the first wireless base station device; and
the wireless terminal device includes
a receiver configured to receive the first control channel, which is transmitted only from the first wireless base station device, and configured to receive data coordinately transmitted from the second wireless base station device using the resource indicated by a received first control channel from the first wireless base station device,
a transmitter configured to transmit a second control channel including first and second control information only to the first wireless base station device, wherein the first control information is channel state information for a link between the wireless terminal and the first wireless base station device and a link between the wireless terminal and the second wireless base station device, and the second control information is Hybrid Automatic Repeat reQuest (HARQ) acknowledgement information for the received data coordinately transmitted from the second wireless base station device, and
a processor configured to perform a HARQ process for the received data coordinately transmitted by the second wireless base station device based on the first control channel, wherein the second control information of the second control channel is generated based on a result of the HARQ process and transmitted only to the first wireless base station device.

2. A wireless terminal device which is capable of receiving data coordinately transmitted from a plurality of wireless base station devices including a first wireless base station device and a second wireless base station device, the wireless terminal device comprising:
a receiver configured to
receive a first control channel which indicates new data or retransmission data and which indicates a resource for receiving data coordinately transmitted from the second wireless base station device, the first control channel is transmitted only from the first wireless base station device, and
receive data coordinately transmitted from the second wireless base station device using the resource which is indicated by a received first control channel from the first wireless base station device;
a transmitter configured to transmit a second control channel including first and second control information only to the first wireless base station device, wherein the first control information is channel state information for a link between the wireless terminal and the first wireless base station device and a link between the wireless terminal and the second wireless base station device, and
the second control information is Hybrid Automatic Repeat reQuest (HARQ) acknowledgement information for the received data coordinately transmitted from the second wireless base station device; and
a processor configured to perform a HARQ process for the received data coordinately transmitted by the second wireless base station device based on the first control channel, wherein the second control information of the second control channel is generated based on a result of the HARQ process and transmitted only to the first wireless base station device.

3. A wireless base station device which corresponds to a first wireless base station device which transmits data coordinately with at least a second wireless base station device, the wireless base station device comprising:
a transmitter configured to transmit to a wireless terminal a first control channel, the first control channel is transmitted only from the first wireless base station device, and the first control channel indicates new data or retransmission data-and indicates to the wireless terminal a resource for receiving data coordinately transmitted from the second wireless base station device;
a receiver configured to receive a second control channel related to a transmission of data coordinately transmitted from the second wireless base station device using the resource which is indicated by the first control channel,
the second control channel including first and second control information, wherein the first control information is channel state information for a link between the wireless terminal and the first wireless base station device and a link between the wireless terminal and the second wireless base station device, and the second control information is Hybrid Automatic Repeat reQuest (HARQ) acknowledgement information for the data coordinately transmitted from the second wireless base station device and received by the wireless terminal and the second control channel being transmitted from the wireless terminal only to the first wireless base station device; and
a processor configured to perform a control so that the wireless terminal performs a HARQ process for the received data coordinately transmitted by the second wireless base station device using the resource indicated by the first control channel, wherein the second control information of the second control channel is generated based on a result of the HARQ process and transmitted by the wireless terminal only to the first wireless base station device.

4. The wireless communication system of claim 1, wherein the resource for receiving data coordinately transmitted from the second wireless base station device is information relating to the assignment of a resource block.

5. A wireless terminal which is capable of receiving data coordinately transmitted from a plurality of wireless base stations including a first wireless base station and a second wireless base station, the wireless terminal comprising:

a receiver configured to receive a first control channel, which is transmitted only from the first wireless base station, the first control channel indicates new data or retransmission data and indicates to the wireless terminal a resource for receiving data coordinately transmitted by the second wireless base station, and receive data coordinately transmitted from the second wireless base station using the resource indicated by the first control channel from the first wireless base station;

processor circuitry configured to control a Hybrid Automatic Repeat reQuest (HARQ) process for received data coordinately transmitted by the second wireless base station based on the resource indicated by the first control channel received from the first wireless base station; and a transmitter configured to transmit a second control channel only to the first wireless base station, the second control channel including Hybrid Automatic Repeat reQuest (HARQ) acknowledgement information for the received data coordinately transmitted by the second wireless base station, wherein the HARQ acknowledgement information for the received data coordinately transmitted by the second wireless base station is transmitted by the wireless terminal only to the first wireless base station.

6. The wireless communication system of claim 5, wherein the resource for receiving data coordinately transmitted from the second wireless base station is information relating to the assignment of a resource block.

* * * * *